(12) United States Patent
Liang et al.

(10) Patent No.: US 10,124,335 B2
(45) Date of Patent: Nov. 13, 2018

(54) INTEGRATED FLUIDIC MODULE

(71) Applicant: DELTA ELECTRONICS INT'L (SINGAPORE) PTE LTD, Singapore (SG)

(72) Inventors: Qian Liang, Singapore (SG); Revata Utama, Singapore (SG); Yi-shao Liu, Singapore (SG)

(73) Assignee: DELTA ELECTRONICS INT'L (SINGAPORE) PTE LTD, Singapore (SG)

( * ) Notice: Subject to any disclaimer, the term of this patent is extended or adjusted under 35 U.S.C. 154(b) by 105 days.

(21) Appl. No.: 15/217,511

(22) Filed: Jul. 22, 2016

(65) Prior Publication Data
US 2018/0015467 A1    Jan. 18, 2018

(30) Foreign Application Priority Data
Jul. 13, 2016    (SG) .......................... 10201605723Y

(51) Int. Cl.
*B01L 3/00* (2006.01)
*F16K 99/00* (2006.01)
*F16K 11/074* (2006.01)

(52) U.S. Cl.
CPC .... *B01L 3/502738* (2013.01); *F16K 11/0743* (2013.01); *F16K 99/0011* (2013.01); *F16K 99/0028* (2013.01); *B01L 2200/028* (2013.01); *B01L 2200/10* (2013.01); *B01L 2400/0633* (2013.01); *F16K 2099/0084* (2013.01)

(58) Field of Classification Search
CPC .......... B01L 3/502738; B01L 2200/10; B01L 2400/0633; B01L 2200/028; F16K 99/0028; F16K 2099/0084
See application file for complete search history.

(56) References Cited

U.S. PATENT DOCUMENTS

| | | | |
|---|---|---|---|
| 6,748,975 B2 | 6/2004 | Hartshorne et al. | |
| 6,852,291 B1 * | 2/2005 | Johnson | B01J 19/0046 137/597 |
| 6,945,269 B2 | 9/2005 | Hattori et al. | |
| (Continued) | | | |

FOREIGN PATENT DOCUMENTS

WO    2007085395 A1    8/2007

*Primary Examiner* — Samuel P Siefke
(74) *Attorney, Agent, or Firm* — Kirton McConkie; Evan R. Witt

(57) ABSTRACT

An integrated fluidic module includes a fluid manifold, a valve stator, a valve rotor and a valve housing. The fluid manifold includes microchannels connected to a sample reaction unit, and fluid input channels connected to fluid sources. The valve stator includes at least one groove and plural through holes, at least one groove is connected with at least one of the plural through holes, and parts of the groove and through holes are communicated with the microchannels and the fluid input channels. The valve rotor includes at least one groove. The valve housing accommodates the valve rotor and the valve stator. When the valve rotor is rotated to different positions, at least one groove of the valve rotor is connected with at least one through hole or groove of the valve stator to provide at least one fluid path and enable fluids provided by the fluid sources to be directed to corresponding chambers of the sample reaction unit through the fluid path.

21 Claims, 20 Drawing Sheets

(56) References Cited

U.S. PATENT DOCUMENTS

| | | |
|---|---|---|
| 7,143,787 B1 | 12/2006 | Bauerle et al. |
| 7,588,051 B2 | 9/2009 | Wolf, Sr. et al. |
| 8,656,955 B2 | 2/2014 | Price |
| 8,770,226 B2 | 7/2014 | Wilen et al. |
| 8,876,081 B2 | 11/2014 | Tower |
| 8,911,688 B2 | 12/2014 | Gransee et al. |
| 2007/0144594 A1* | 6/2007 | Moon ................... F16K 11/074 137/625.46 |
| 2008/0056949 A1 | 3/2008 | Lee et al. |
| 2015/0020904 A1 | 1/2015 | Gartner et al. |

\* cited by examiner

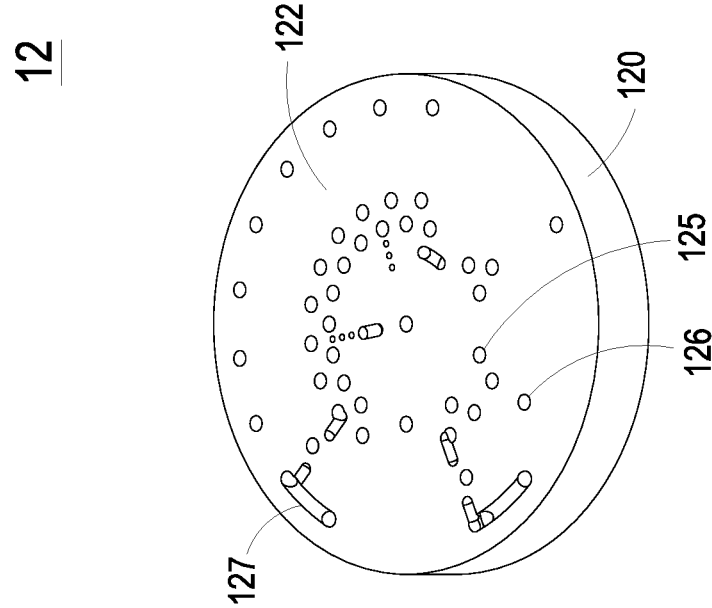
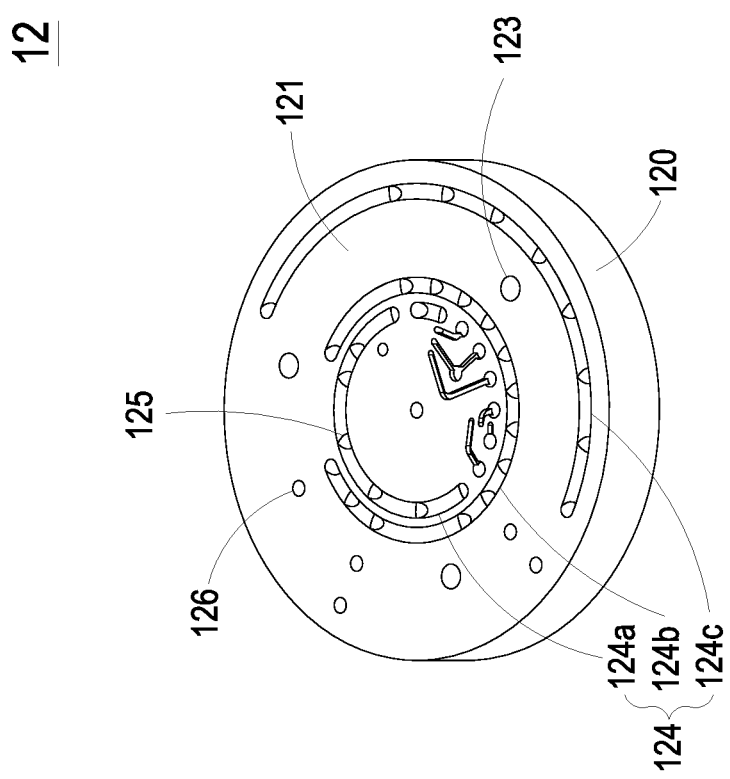
FIG. 5B
FIG. 5A

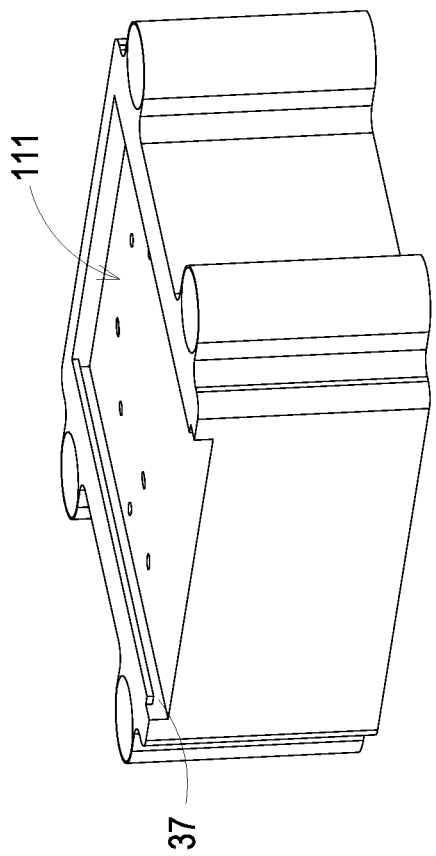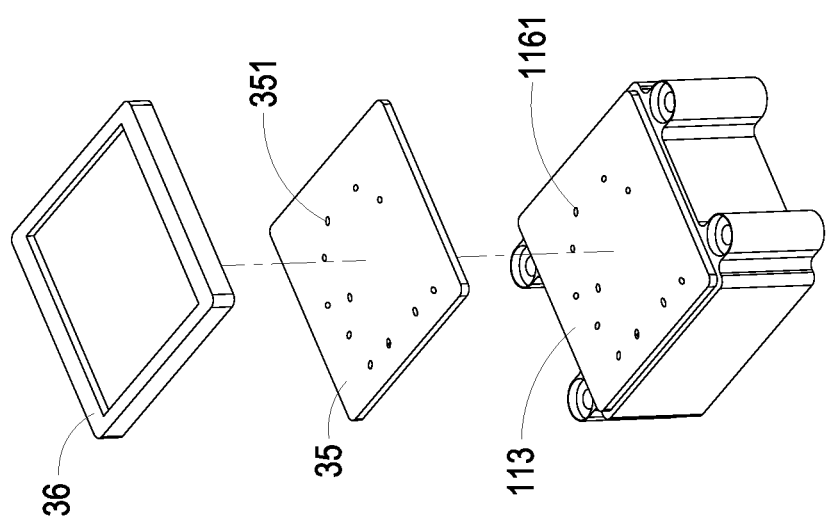
FIG. 10B
FIG. 10A

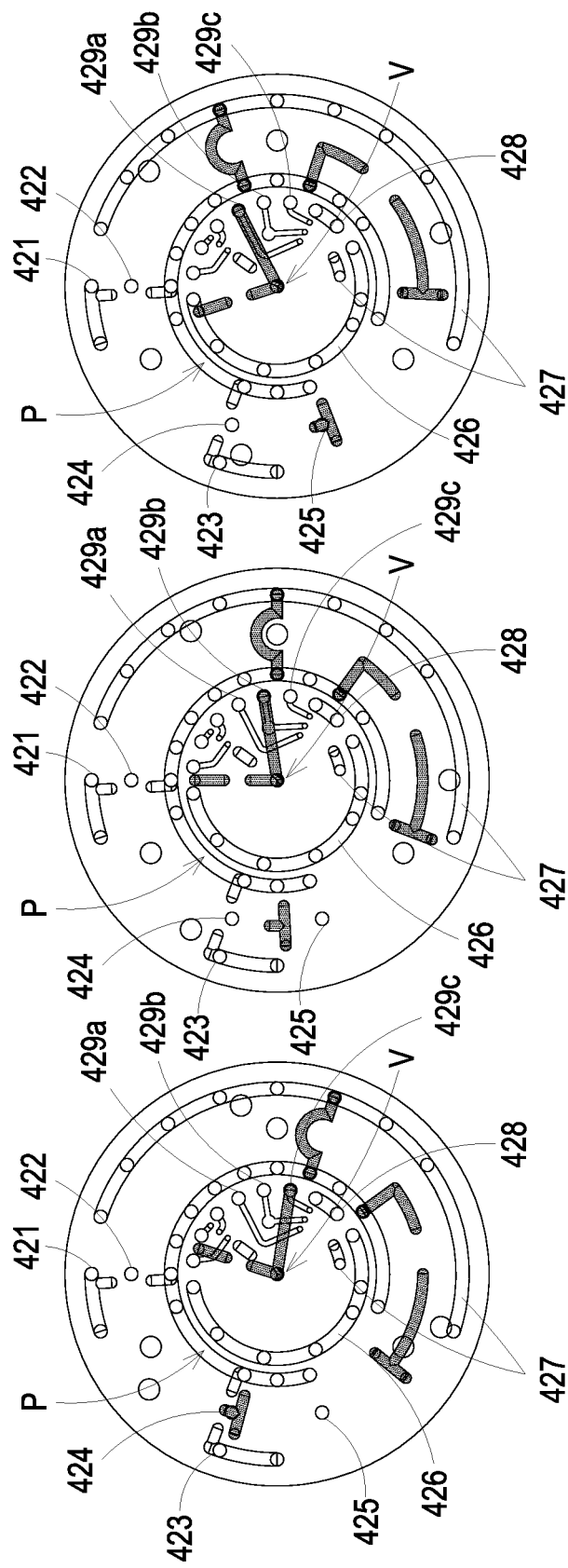

INTEGRATED FLUIDIC MODULE

FIELD OF THE INVENTION

The present invention relates to an integrated fluidic module, and more particularly to an integrated fluidic module having a build-in rotary valve.

BACKGROUND OF THE INVENTION

With the advance of technology and modern transportation, the propagation speeds of infectious diseases (e.g., SARS, avian flu, dengue fever and other diseases) are accelerated and become inestimable in today's world. Consequently, scientists are attempting to explore novel solutions for rapidly diagnosing, early isolation as well as suggested therapeutic treatment of suspected cases. In other words, a "real-time and in-situ detecting means" is an important issue to study infectious diseases.

In most practical application of fluid processing and regulating for clinical trials and diagnostics, such as protein purification and bacteria culture, a series of sample processing steps such as tissue dissociation, bacteria capture, cell lysis, nuclear acid extraction and washing, are always inevitable. Typically these processing steps require complex lab protocols and they are operated by skilled researchers with test tubes, pipettes and relevant equipment in a central laboratory.

"Lab-on-a-chip" is a novel concept proposed in recent years. In the lab-on-a-chip technology, various miniature components are integrated within a small platform so as to achieve the purposes of point of care (POC) and in vitro diagnostics (IVD). Essentially, it is a medical diagnostic platform with "miniature volume", "high accuracy" and "real-time diagnostics". Such platform could be effectively realized by microfluidic technology capable of processing various biological and chemical samples or reagents on a business-card-sized chip or cartridge.

On a typical microfluidic device, several common laboratory functions such as flow pumping, valving, mixing, heating and many reactions are compactly integrated on-chip and complex sample processing are normally programmable to realize automatic operations. However, most of lab-on-a-chip technologies developed in the laboratory is not appropriate for industrial applications. For example, in molecular diagnostics, the microfluidic chip used for sample testing requires low-cost, ease of mass production and disposable and therefore plastic chips made by injection molding or hot embossing are still prevalent. As the plastic microfluidic chip or cartridge is very hardly and in most situations unable to completely realize "lab-on-a-chip" functions, fluid dispensing and regulating within multiple chambers on microfluidic devices highly rely on various external pumps, valves, sensors and actuators. In these designs, each reagent chamber and microfluidic channel are regulated by one or more individual electromagnetic valves and therefore the isolation or connection of corresponding fluidic loop is solely controlled by valve opening or closing.

Such designs, though being able to deliver fluid within the system, are very costly and normally occupy a huge amount of space. Moreover, the electromagnetic valves, the pumps and the microfluidic cartridge are most connected with tubing and therefore yield short lifespan, space consuming, low reliability and poor manufacturability and thus are inappropriate to high volume mass production. Furthermore, such solution is lack of modular design concept and is hardly to be straightforwardly used by other systems without redesign.

Therefore, there is a need of providing a fluid control device in order to overcome the above drawbacks.

SUMMARY OF THE INVENTION

An object of the present invention is to provide an integrated fluidic module using a build-in rotary valve for fluid path switching, so as to reduce the cost and the equipment space as well as improve the reliability and manufacturability.

An another object of the present invention is to provide an integrated fluidic module using microchannels in the fluid manifold to deliver fluids, so as to avoid the drawbacks resulted from the tubing used in the conventional techniques.

An additional object of the present invention is to provide an integrated fluidic module to realize multiple fluid path switching by the alignments of the through holes and grooves of the valve stator and the valve rotor.

A further object of the present invention is to provide an integrated fluidic module having modular designed structure, which is able to be applied to different sample reaction units and thus possesses high industrial value.

According to an aspect of the present invention, an integrated fluidic module connected with a sample reaction unit having multiple chambers is provided to regulate fluid operations in a multi-fluid-system. The integrated fluidic module includes a fluid manifold, a valve stator, a valve rotor and a valve housing. The fluid manifold includes a main body, plural microchannels and plural fluid input channels, wherein each of the plural microchannels penetrates through the main body and is connected with a corresponding chamber of the sample reaction unit, and the plural fluid input channels are connected with plural fluid sources. The valve stator is attached to the fluid manifold and includes at least one groove and plural through holes, wherein at least one groove of the valve stator is disposed on a top surface or a bottom surface of the valve stator and is directly connected with at least one of the plural through holes, and at least parts of the groove and the through holes are communicated with the plural microchannels and plural fluid input channels of the fluid manifold. The valve rotor is attached to the valve stator and includes at least one groove disposed on a top surface of the valve rotor. The valve housing includes a receiving chamber for accommodating the valve rotor and the valve stator and is fixed and assembled with the fluid manifold to form a modular structure. When the valve rotor is rotated to different positions, the at least one groove of the valve rotor is connected with at least one of the plural through holes or the at least one groove of the valve stator to provide at least one fluid path and enable fluids provided by the fluid sources to be directed to the corresponding chambers of the sample reaction unit through the fluid path and thus regulate the fluid operations of the corresponding chambers.

According to another aspect of the present invention, a method of regulating fluid operations in a multi-fluid-system by using the aforesaid integrated fluidic module is provided. The method includes the steps of: installing the sample reaction unit on the fluid manifold of the integrated fluidic module, so that the plural microchannels of the fluid manifold are connected with the multiple chambers of the sample reaction unit; and rotating the valve rotor of the integrated fluidic module from a first position to a second position, so that the at least one groove of the valve rotor is connected with at least one of the plural through holes or the at least one groove of the valve stator to provide at least one fluid path and enable fluids provided by the fluid sources to be directed to the corresponding chambers of the sample reaction unit through the fluid path and thus regulate the fluid operations of the corresponding chambers.

The above objects and advantages of the present invention become more readily apparent to those ordinarily skilled in the art after reviewing the following detailed description and accompanying drawings, in which:

BRIEF DESCRIPTION OF THE DRAWINGS

FIGS. 5A and 5B show different views of the valve stator;

FIG. 10A shows the fluid manifold according to another embodiment of the present invention;

FIG. 10B shows the fluid manifold according to an additional embodiment of the present invention;

FIGS. 13A to 20C show transparent views of the assembly of the valve rotor and the valve stator when the valve rotor is rotated to different positions.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
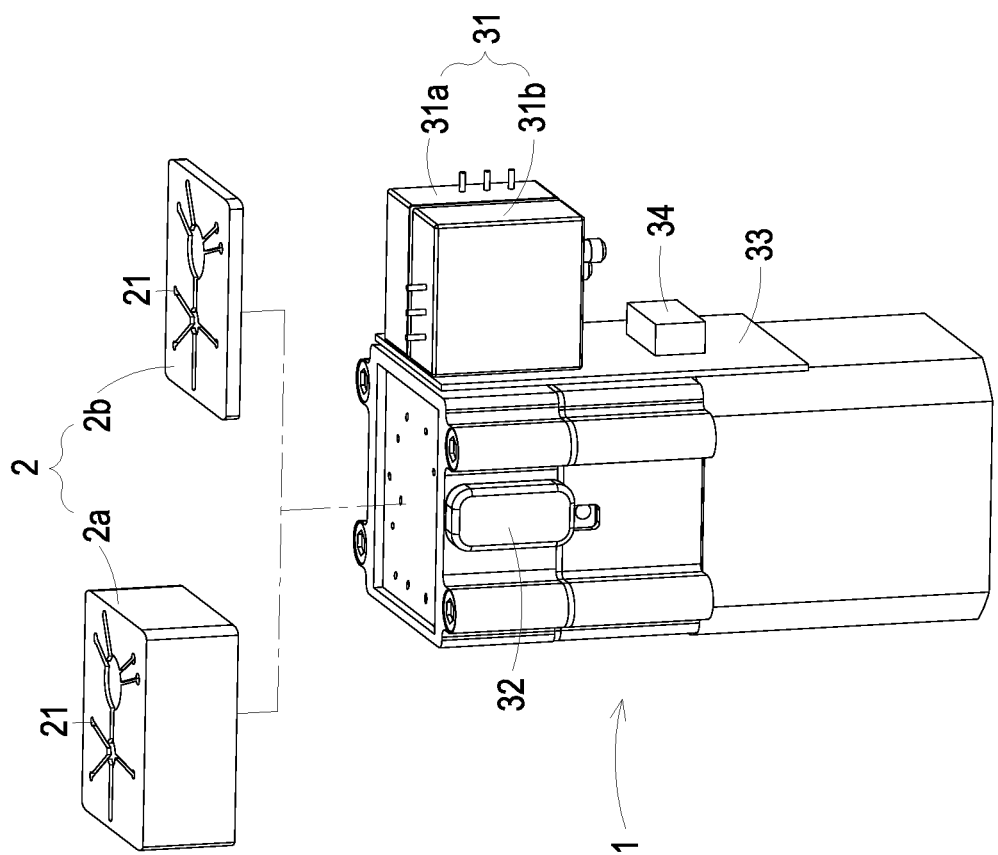
FIG. 1 shows the integrated fluidic module and the sample reaction unit according to a preferred embodiment of the present invention.

The present invention provides an integrated fluidic module connected with a sample reaction unit having multiple chambers to regulate fluid operations in a multi-fluid-system, so that the fluids, such as samples or reagents, in the multiple chambers are pushed to flow toward desired directions. FIG. 1 shows the integrated fluidic module and the sample reaction unit according to a preferred embodiment of the present invention. As shown in FIG. 1, the sample reaction unit 2 is mounted on the integrated fluidic module 1, and the sample reaction unit 2 is a sample cartridge 2a or a microfluidic chip 2b. The sample reaction unit 2 includes multiple chambers 21, such as sample chamber, lysis buffer chamber, wash buffer chamber, elution buffer chamber, antibody chamber, reaction chamber, waste chamber, product collection chamber and so on, for processing various biomedical or chemical experiments and detections, such as nuclear acid extractions, protein purifications, clinical disease detections, novel medicine researches, and other biomedical or chemical researches. In these experiments and detections, samples or reagents must flow from the reservoir chamber to the reaction chamber according to the reaction protocols, and the waste must be collected at the waste chamber as well. Therefore, an object of the present invention is to provide a solution for multi-way fluid dispensing and regulating by using the integrated fluidic module 1 with build-in rotary valve, and further realize automatic processing or detection.

Figure 2:
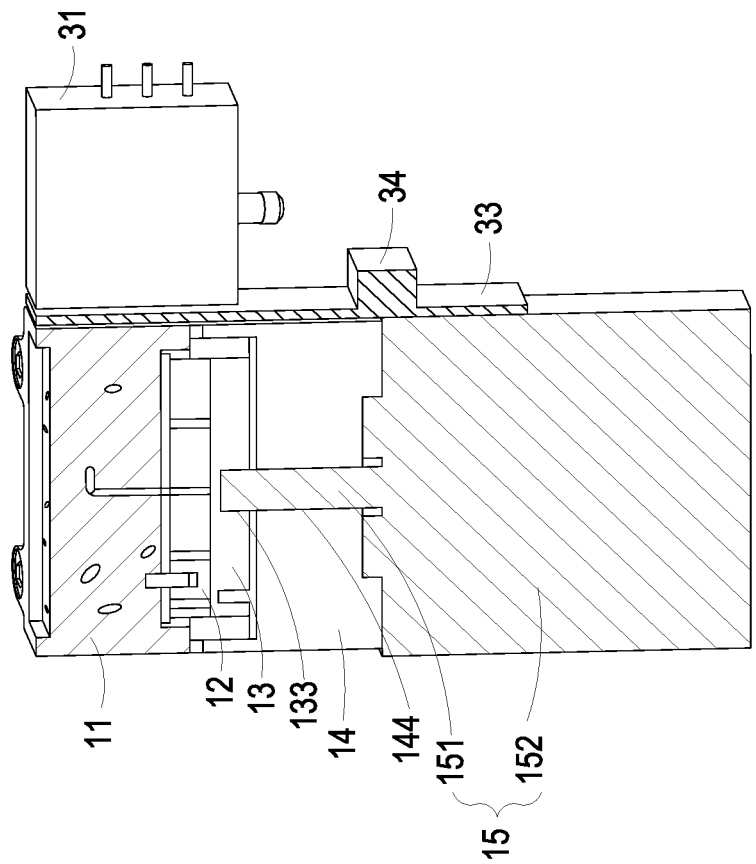
FIG. 2 shows a cross-sectional view of the integrated fluidic module.
Figure 3:
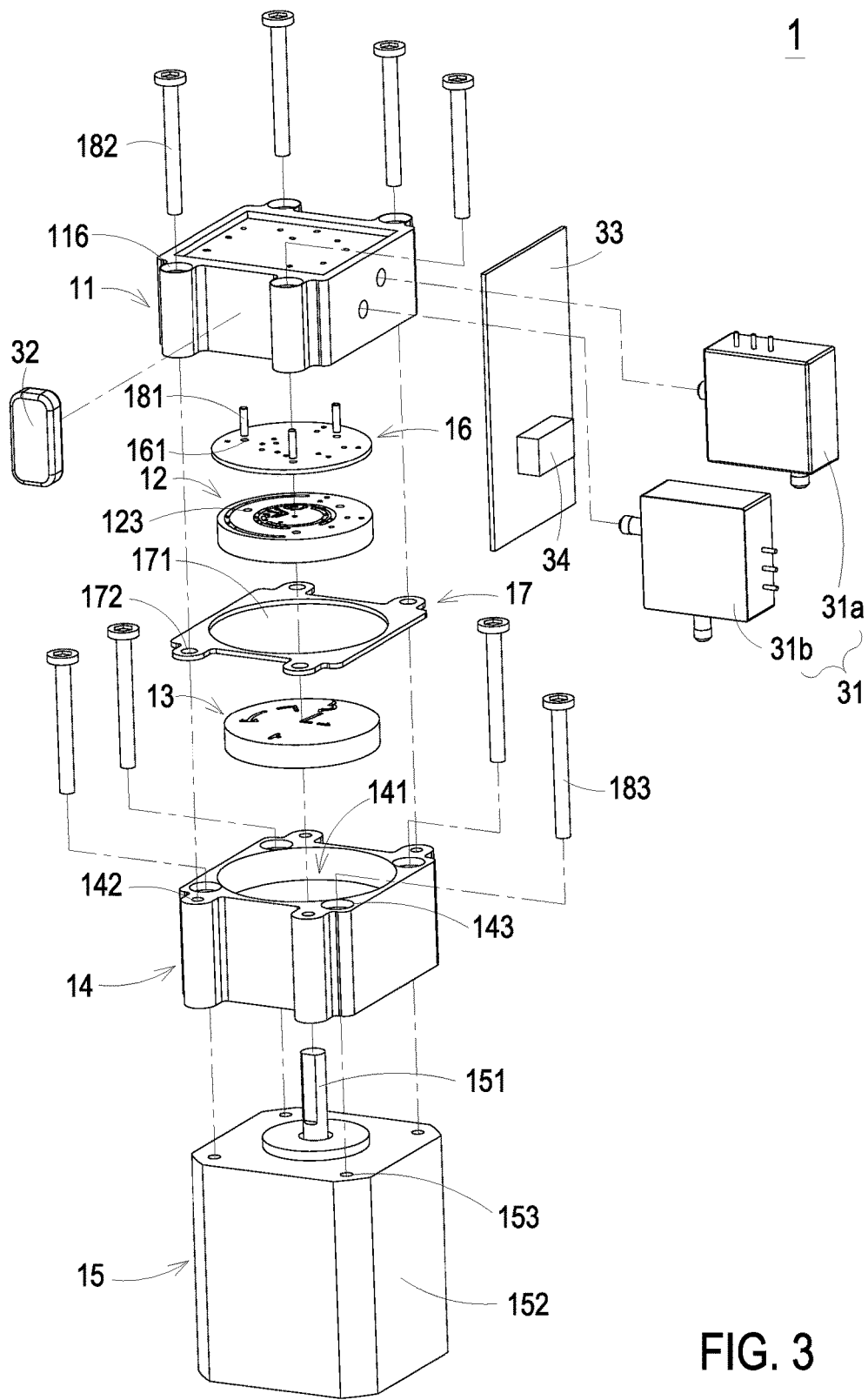
FIG. 3 shows an exploded view of the integrated fluidic module.

FIG. 2 shows a cross-sectional view of the integrated fluidic module according to a preferred embodiment of the present invention. FIG. 3 shows an exploded view of the integrated fluidic module according to a preferred embodiment of the present invention. As shown in FIGS. 2 and 3, the integrated fluidic module 1 includes a fluid manifold 11, a valve stator 12, a valve rotor 13 and a valve housing 14. The valve stator 12 and the valve rotor 13 collectively form the build-in rotary valve. The valve stator 12 is attached to a bottom of the fluid manifold 11, and the valve rotor 13 is attached to a bottom of the valve stator 12. The valve housing 14 accommodates the valve rotor 13 and parts of the valve stator 12 therein, and is fixed and assembled with the fluid manifold 11 to form a modular structure.

In an embodiment, the integrated fluidic module 1 further includes a driving unit 15. The driving unit 15 includes a shaft 151 and a motor 152, such as a stepped motor. The shaft 151 is connected to the valve rotor 13, and the valve rotor 13 is driven by the motor 152 to rotate a certain angle, i.e. to rotate from a first position to a second position, so as to realize fluid path switching. In another embodiment, the motor 152 is not necessary and the valve rotor 13 is manually operated by users through a knob or a handle.

During the rotary valve operation, a compression force is applied on the interface of the valve stator 12 and valve rotor 13 in order to minimize the leaking. In an embodiment, the compression force is provided by one or one set of disc springs which are disposed at the bottom of the valve rotor 13, so that the valve rotor 13 is compelled to tightly contact the valve stator 12 without leaking. In another embodiment, the integrated fluidic module 1 further includes bearings and washers to minimize the friction during the rotation of the valve rotor 13.

Please refer to FIGS. 1 to 3 again. The integrated fluidic module 1 further includes plural fluid sources 31, which includes but not limited to a first fluid source 31a and a second fluid source 31b. The fluid sources 31 are connected to the fluid manifold 11 for providing fluids, and the fluids may be gas or liquid. In an embodiment, the fluid sources 31 are gas fluid sources, such as pumps, and the first fluid source 31a and the second fluid source 31b are airs with pressures lower and higher than the atmosphere, respectively. In other words, the first fluid source 31a and the second fluid source 31b provide negative pressure and positive pressure to the integrated fluidic module 1, respectively. In this embodiment, since the fluid sources 31 are gases, contamination issue resulted from the residual liquids when the fluid sources 31 are liquids could be avoided.

In some other embodiments, the fluid sources 31 may be compressed gas, vacuum source, liquid reservoir or combinations thereof. The first fluid source 31a and the second fluid source 31b may be both gas, both liquid, or one gas and one liquid.

In an embodiment, the integrated fluidic module 1 further includes at least one sensor 32, such as pressure sensor, flow rate sensor, temperature sensor, pH meter or other types of sensors. The sensor 32 is connected to the fluid manifold 11 for detecting internal signals, such as pressure, flow rate, temperature or pH, of the fluid manifold 11.

In an embodiment, the integrated fluidic module 1 further includes a circuit board 33 and a microcontroller 34. The circuit board 33 and the microcontroller 34 are connected to the fluid sources 31, the sensor 32 and the motor 152 to control the fluid sources 31, the sensor 32 and the motor 152 to be programmed with predefined schemes, and thus, the fluids provided by the fluid sources 31 can be directed to predefined chambers 21 in the sample reaction unit 2, so as to regulate the fluid operations in the chambers 21.

Figure 4B:
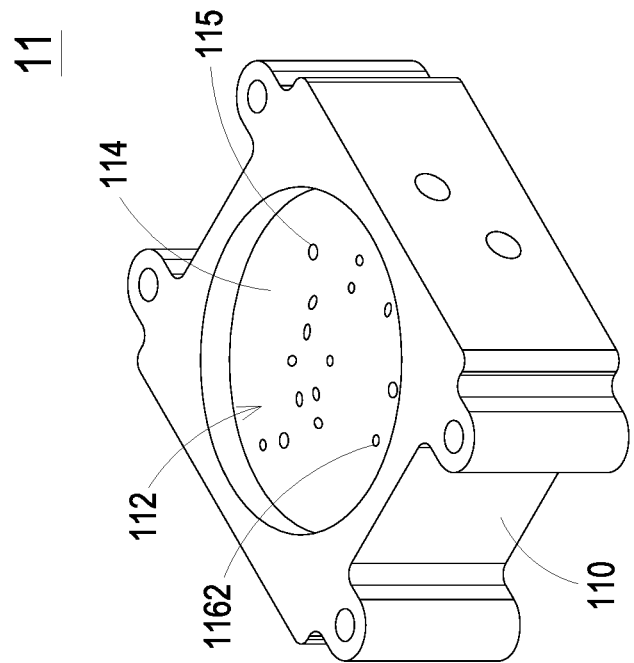
FIGS. 4A and 4B show different views of the fluid manifold.
Figure 4A:
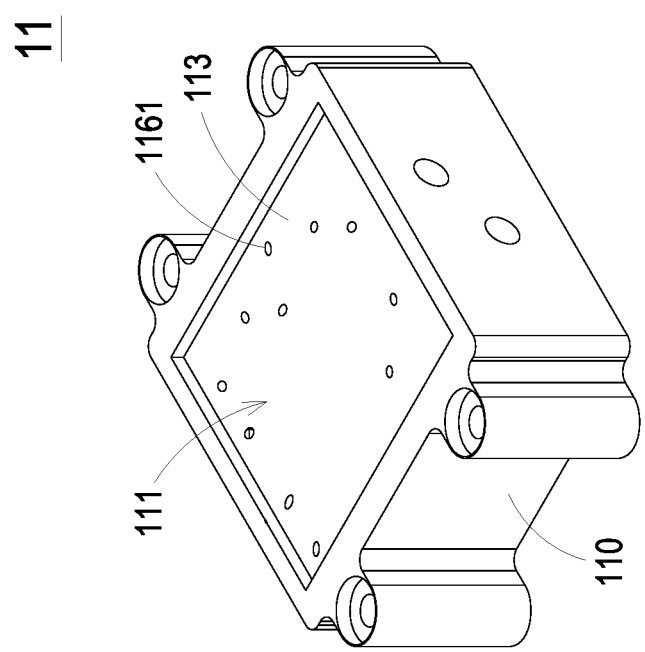
Figure 6B:
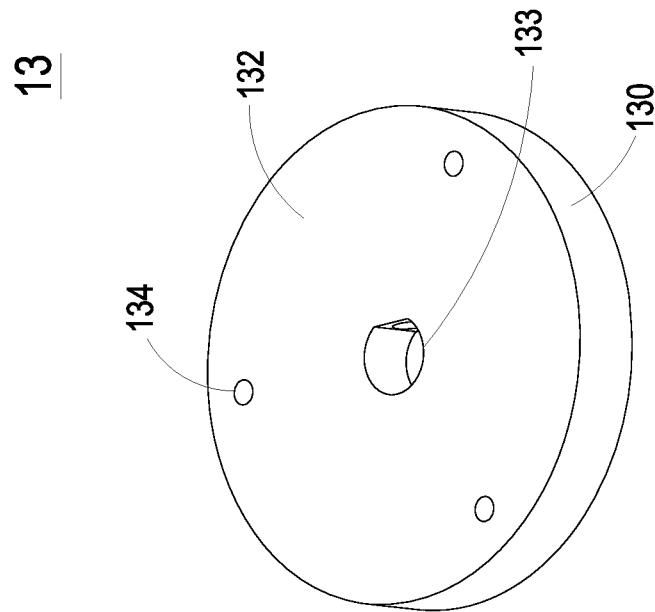
FIGS. 6A and 6B show different views of the valve rotor.
Figure 6A:
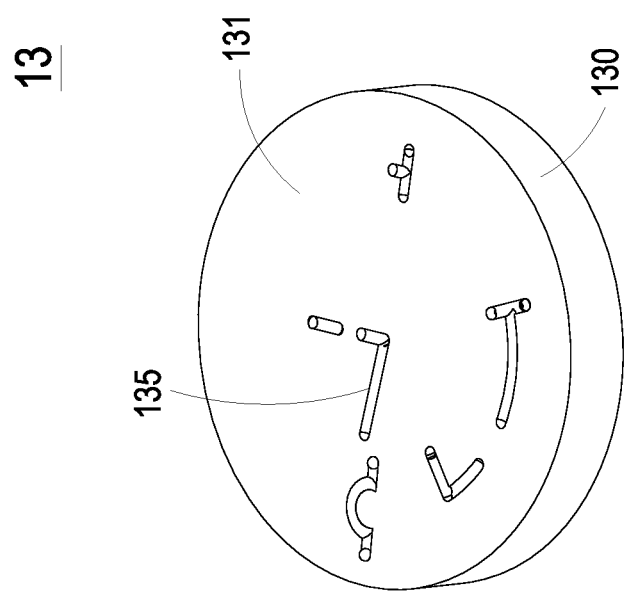

Please refer to FIGS. 1 to 3 again and also refer to FIGS. 4A to 6B, wherein FIGS. 4A and 4B show different views of the fluid manifold, FIGS. 5A and 5B show different views of the valve stator, and FIGS. 6A and 6B show different views of the valve rotor. The fluid manifold 11 includes a main body 110, an installation chamber 111, and a first receiving chamber 112. The installation chamber 111 is disposed on a top surface 113 of the main body 110 for installing the sample cartridge 2a or the microfluidic chip 2b thereon. The first receiving chamber 112 is disposed on a bottom surface 114 of the main body 110, and the shape of the first receiving chamber 112 is substantially corresponding to the shape of the valve stator 12 and slightly larger than the valve stator 12 for accommodating the valve stator 12 therein. In an embodiment, the installation chamber 111 is a concaved platform, such as but not limited to grooves, slots and clips. The depth of the installation chamber 111 is ranged from 0.1 mm to 10 mm depending on the dimensions of the sample reaction unit 2 and is preferably ranged from 0.5 mm to 5 mm.

In an embodiment, the material of the fluid manifold 11 is but not limited to metal, wood, plastic, polymer or glass. The fluid manifold 11 can be fabricated by using CNC machining, casting, inject molding, 3-dimensional printing or layer-to-layer bonding, but not limited thereto.

In an embodiment, the shape of the bottom surface 114 of fluid manifold 11 may be flat, spherical, cambered, cone-shaped, or other irregular shapes as long as it is able to match the top surface of the valve stator 12.

The valve stator 12 is substantially shaped but not limited as a thin cylinder having a main body 120, a top surface 121 and a bottom surface 122. The valve rotor 13 is also substantially shaped but not limited as a thin cylinder having a main body 130, a top surface 131 and a bottom surface 132. When the valve stator 12 and the valve rotor 13 are assembled in the integrated fluid module 1, the top surface 131 of the valve rotor 13 is attached to the bottom surface 122 of the valve stator 12.

In some other embodiments, the cross-sectional shape of the valve stator 12 is not limited to round shape, and it may be rectangular, triangular or other irregular shapes. In an embodiment, the valve stator 12 has a diameter from 1 mm to 100 mm and a thickness from 0.5 mm to 50 mm. In an embodiment, the material of the valve stator 12 could be metal such as stainless steel, nickel or titanium, and also could be plastic, polymer, glass or ceramic.

In an embodiment, the shape of the top surface 121 of the valve stator 12 may be flat, spherical, cambered, cone-shaped, or other irregular shapes as long as it is able to match the bottom surface 114 of fluid manifold 11.

In an embodiment, the top surface 121 of the valve stator 12 is directly attached to the bottom surface 114 of fluid manifold 11. In another embodiment, the integrated fluidic module 1 may selectively include a gasket 16, which is sandwiched between the bottom surface 114 of the fluid manifold 11 and the top surface 121 of the valve stator 12. The compression force provided by the deformation of the gasket 16 offers additional sealing between the fluid manifold 11 and the valve stator 12. In this embodiment, the integrated fluidic module 1 further includes plural first fixing elements 181, such as dowel pins, for penetrating through the corresponding holes 115, 161 and 123 of the fluid manifold 11, the gasket 16 and the valve stator 12 so as to fix the gasket 16 and the valve stator 12 in the first receiving chamber 112 of the fluid manifold 11. In an embodiment, the holes 115 and 123 are blind holes, and the hole 161 is a through hole. Certainly, the means of fixing the gasket 16, the valve stator 12 and the fluid manifold 11 is not limited to the dowel pins, and can also be extrusions, screws, grooves, hinge slots or other designs.

In an embodiment, the material of the gasket 16 is rubber, elastomer or other soft plastic, and the thickness of the gasket 16 is ranged from 0.1 mm to 5 mm. In some embodiments, specifically with low valve rotation torques, disc springs are not necessary and therefore the gasket 16 also serves as a "soft spring". In addition to offering additional sealing between the fluid manifold 11 and the valve stator 12, another function of the gasket 16 is to reduce the surface finish requirements on both the bottom surface 114 of fluid manifold 11 and the top surface 121 of valve stator 12.

In an embodiment, the surface shape of the gasket 16 may be flat, spherical, cambered, cone-shaped, or other irregular shapes as long as it is able to match the bottom surface 114 of fluid manifold 11 and the top surface 121 of the valve stator 12.

In some other embodiments, the cross-sectional shape of the valve rotor 13 is not limited to round shape, and it may be rectangular, triangular or other irregular shapes. In an embodiment, the valve rotor 13 has a diameter from 1 mm to 100 mm and a thickness from 0.5 mm to 50 mm. In an embodiment, the material of the valve rotor 13 could be metal such as stainless steel, nickel or titanium, and also could be plastic, polymer, glass or ceramic.

In an embodiment, the valve housing 14 includes a second receiving chamber 141 disposed on the top of the valve housing 14, and the shape of the second receiving chamber 141 is substantially corresponding to the shape of the valve rotor 13 and larger than the valve rotor 13 for accommodating the valve rotor 13 and parts of the valve stator 12 therein.

In an embodiment, the integrated fluidic module 1 may selectively include a spacer 17, which is sandwiched between the fluid manifold 11 and the valve housing 14, and has a central through hole 171 corresponding to the valve stator 12 and the valve rotor 13. In an embodiment, the integrated fluidic module 1 further includes plural second fixing elements 182, such as but not limited to screws or dowel pins, for penetrating through the corresponding holes 116, 172 and 142 of the fluid manifold 11, the spacer 17 and the valve housing 14 so as to assemble and fix the fluid manifold 11, the spacer 17 and the valve housing 14. In another embodiment, since the spacer 17 is not an essential component, the spacer 17 shown in FIG. 3 may be removed to reduce the whole height of the integrated fluidic module 1.

In an embodiment, the integrated fluidic module 1 further includes plural third fixing elements 183, such as but not limited to screws or dowel pins, for penetrating through the corresponding holes 143 and 153 of the valve housing 14 and the driving unit 15 so as to assemble and fix the valve housing 14 and the driving unit 15.

As shown in FIGS. 2 and 6B, there is a blind hole 133 disposed at the bottom surface 132 of the valve rotor 13. The shaft 151 of the driving unit 15 is penetrated through a through hole 144 of the valve housing 14 and then inserted into the blind hole 133 at the bottom surface 132 of the valve rotor 13. The blind hole 133 is tightly fitted with the shaft 151, and when the motor 152 drives the rotation of the shaft 151, the valve rotor 13 is rotated from a first position to a second position. In an embodiment, the top of the shaft 151 is a cylinder having a cut surface, and the blind hole 133 has a corresponding shape to be tightly fitted with the shaft 151. Certainly, the shapes of the top of the shaft 151 and the blind hole 133 may also be other shapes as long as they are tightly fitted with each other. For example, the cross-sectional shapes thereof may be rectangle, cross or star.

In some embodiments, the valve rotor 13 is not directly fixed on the shaft 151 of the driving unit 15, but indirectly connected with the driving unit 15 through a rotor holder. In some other embodiments, the valve rotor 13 may be fixed with the driving unit 15 and the rotor holder through screws, dowel pins or other fixing means. In an embodiment, the bottom surface 132 of the valve rotor 13 may selectively include plural blind holes 134 so that the valve rotor 13 may be fixed and aligned by screws or dowel pins.

Figure 7:
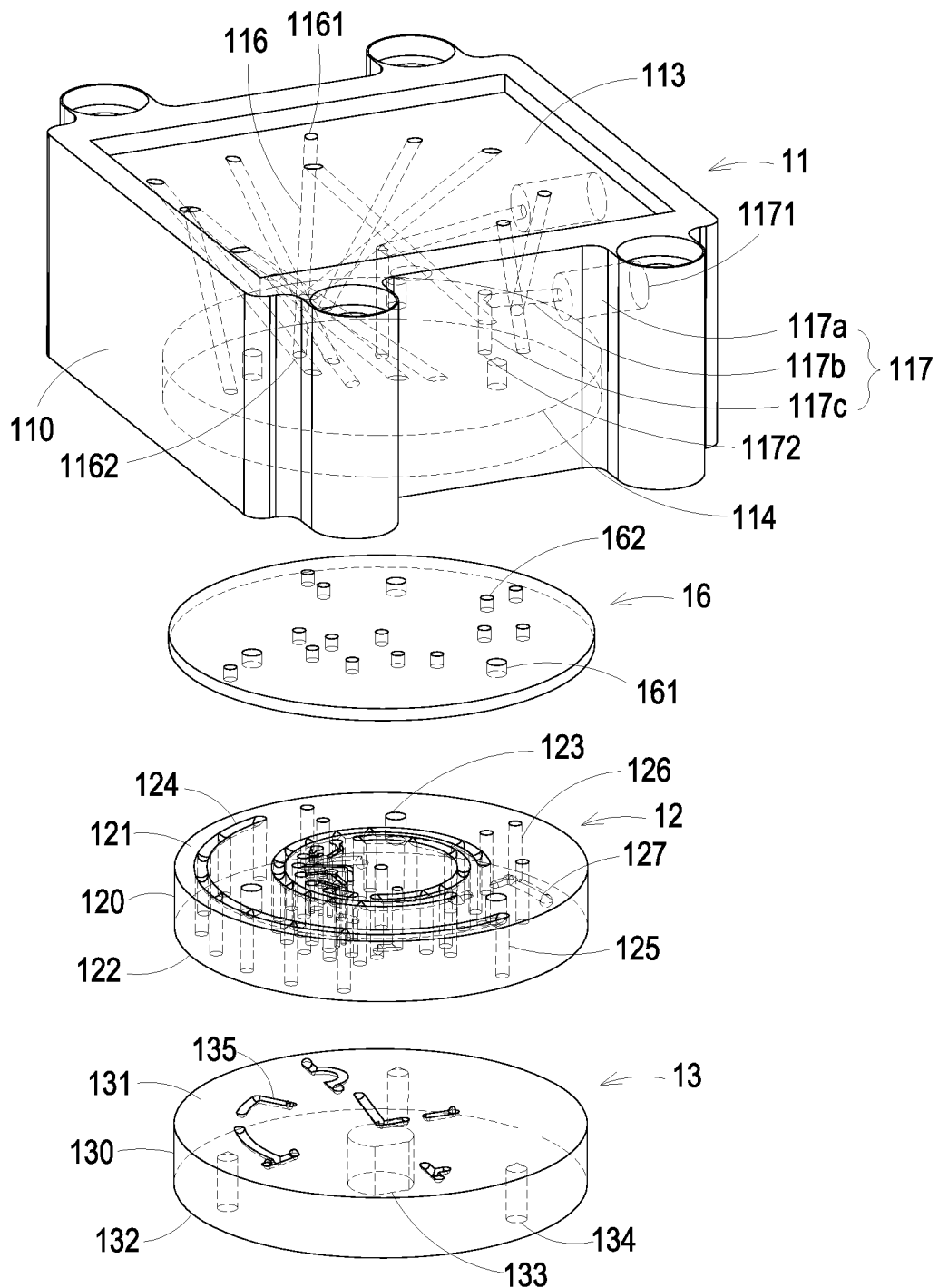
FIG. 7 shows a transparent view of the fluid manifold, the gasket, the valve stator and the valve rotor.

Please refer to FIG. 7 and FIGS. 4A to 6B as well, wherein FIG. 7 shows a transparent view of the fluid manifold, the gasket, the valve stator and the valve rotor. First, it is to be noted that the gasket 16 may be omitted in the structure of the integrated fluidic module 1, that is, the valve stator 12 can be directly attached the bottom of the fluid manifold 11 without the gasket 16. As shown in the figures, the fluid manifold 11 includes plural microchannels 116. Each of the plural microchannels 116 is penetrated through the main body 110 of the fluid manifold 11, and has a first opening 1161 and a second opening 1162 at the top surface 113 and the bottom surface 114 of the fluid manifold 11, respectively. The first openings 1161 of the microchannels 116 are aligned with the openings at the bottom of the sample cartridge 2a or the microfluidic chip 2b, which are accesses to the chambers 21 of the sample cartridge 2a or the microfluidic chip 2b. The microchannels 116 may be straight, curved, L-shaped, serpentine or whatever shapes as long as they are not intercrossed. In an embodiment, the diameter of the microchannel 116 is ranged from 0.1 mm to 4 mm.

In an embodiment, as shown in FIG. 7, two or more microchannels 116 may commonly own the same opening on the top surface 113 or the bottom surface 114 to increase more variety of the fluid paths. In other words, two or more microchannels 116 may have the same first opening 1161 or the same second opening 1162.

The fluid manifold 11 further includes plural third openings 1171 disposed on but not limited to one surface of the fluid manifold 11 for connecting with the fluid sources 31 to enable the fluids provided by the fluid sources 31 to be delivered to the fluid manifold 11. The third opening 1171 is connected to the bottom surface 114 of the fluid manifold 11 through a fluid input channel 117, and the fluid input channel 117 has a fourth opening 1172 at the bottom surface 114 of the fluid manifold 11. In an embodiment, the fluid input channel 117 includes a first channel 117a, a second channel 117b and a third channel 117c. The other designs for the fluid input channel 117 are also applicable to the present invention as long as they can direct the fluids provided by the fluid sources 31 to the valve stator 12 through the fluid manifold 11. In another embodiment, the first channel 117a includes at least one branch (not shown) for connecting with the sensor 32.

The gasket 16 includes plural through holes 162, which are aligned with the second openings 1162 of the microchannels 116 and the fourth openings 1172 of the fluid input channels 117, and thus are connected with the microchannels 116 and the fluid input channels 117.

The valve stator 12 includes at least one first groove 124 and plural first through holes 125. The first through holes 125 are penetrated through the main body 120 of the valve stator 12. The first groove 124 is disposed on the top surface 121 of the valve stator 12 and is extended along the top surface 121 and directly connected with the first through holes 125. In other words, the first groove 124 passes through the first through holes 125, and the first through holes 125 have openings in the first groove 124. Each first groove 124 is directly connected with at least one, preferably at least two, of the plural first through holes 125. At least parts of the first groove 124 or the first through holes 125 are aligned with at least one through hole 162 of the gasket 16, at least one second opening 1162 of the microchannel 116 or at least one fourth opening 1172 of the fluid input channel 117, so that the parts of the first groove 124 or the first through holes 125 are communicated with the microchannels 116 and the fluid input channels 117 of the fluid manifold 11. In an embodiment, the diameter of the first through hole 125 is not greater than the width of the first groove 124, and the incoming fluids introduced from the fluid manifold 11 are distributed to multi-paths via the first groove 124 and the first though holes 125 to the bottom surface 122 of valve stator 12.

In an embodiment, the width and the depth of the first groove 124 are both ranged from 0.1 mm to 5 mm and the cross-section of the first groove 124 can be round, rectangular, triangular, trapezoid or other shapes as long as the fluids are able to pass through the first groove 124. In an embodiment, the first groove 124 is extended along a circular pattern but not limited thereto, and it can also be straight, curved, serpentine, L-shaped, T-shaped or other shapes. In an embodiment, the valve stator 12 includes the first grooves 124a, 124b and 124c, and the first grooves 124a, 124b and 124c are extended along concentric circles with different radiuses.

In an embodiment, the valve stator 12 further includes plural second through holes 126 which are penetrated through the main body 120 of the valve stator 12 and are not directly connected with the first groove 124. In other words, the first groove 124 does not pass through the second through holes 126. The second through holes 126 are aligned with at least one through hole 162 of the gasket 26, at least one second opening 1162 of the microchannel 116 or at least one fourth opening 1172 of the fluid input channel 117, so that the second through holes 126 are communicated with the microchannels 116 and the fluid input channels 117 of the fluid manifold 11.

In an embodiment, the valve stator 12 further includes at least one second groove 127 disposed on the bottom surface 122 of the valve stator 12. The second groove 127 is extended along the bottom surface 122 and directly connected with at least one or at least two of the second through holes 126. In other words, the second groove 127 passes through at least one or at least two of the second through holes 126, and the second through holes 126 have openings in the second groove 127. In an embodiment, the width and the depth of the second groove 127 are both ranged from 0.1 mm to 5 mm and the cross-section of the second groove 127 can be round, rectangular, triangular, trapezoid or other shapes as long as the fluids are able to pass through the second groove 127. In an embodiment, the second groove 127 can be extended along circular, straight, curved, serpentine, L-shaped, T-shaped or other shaped pattern.

The valve rotor 13 is disposed at the bottom of the valve stator 12, and the top surface 131 of the valve rotor 13 directly contacts the bottom surface 122 of the valve stator 12. The valve rotor 13 includes at least one third groove 135 or other concaved pattern disposed on the top surface 131 of the valve rotor 13. When the valve rotor 13 is rotated by a certain angle to a predetermined position, the third groove 135 at the top surface 131 of the valve rotor 13 is selectively connected with at least one of the second groove 127 at the bottom surface 122 of the valve stator 12, the first through holes 125 and the second through holes 126 to realize fluid path switching.

In an embodiment, the width and the depth of the third groove 135 are both ranged from 0.1 mm to 5 mm and the cross-section of the second groove 127 can be round, rectangular, triangular, trapezoid or other shapes as long as the fluids are able to pass through the third groove 135. In an embodiment, the third groove 135 can be extended along circular, straight, curved, serpentine, L-shaped, T-shaped or other shaped pattern.

Figure 8B:
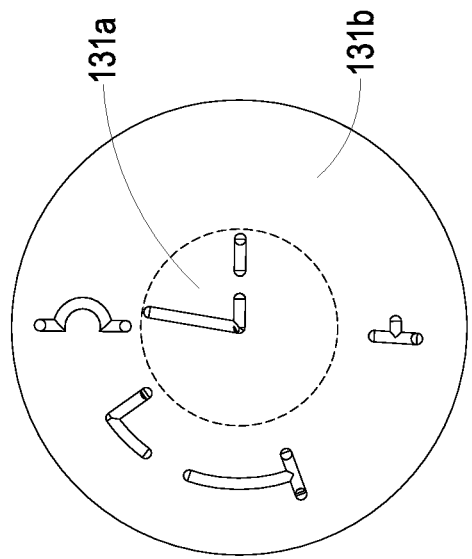
FIG. 8B shows a top view of the valve rotor.
Figure 8A:
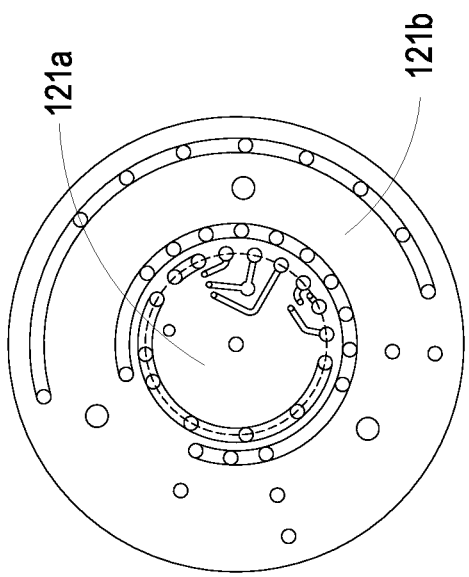
FIG. 8A shows a top view of the valve stator.

Please refer to FIGS. 8A and 8B, wherein FIG. 8A shows a top view of the valve stator, and FIG. 8B shows a top view of the valve rotor. In an embodiment, the valve stator 12 and the valve rotor 13 are respectively divided into plural regions, and the plural regions are divided axially, sectorially or irregularly. Each region includes grooves and/or through holes responsible to the regulation of one type of fluid source. For example, as shown in FIGS. 8A and 8B, the top surface 121 of the valve stator 12 and the top surface 131 of the valve rotor 13 respectively includes two regions, and the two regions are separated by dashed lines, wherein the top surface 121 of the valve stator 12 includes an inner region 121a and an outer region 121b, and the top surface 131 of the valve rotor 13 includes an inner region 131a and an outer region 131b. In an embodiment, the inner region 121a of the valve stator 12 and the inner region 131a of the valve rotor 13 collectively involves the regulation of the first fluid source 31a, such as the regulation of the negative pressure, and the outer region 121b of the valve stator 12 and the outer region 131b of the valve rotor 13 collectively involves the regulation of the second fluid source 31b, such as the regulation of the positive pressure.

Certainly, the divisions are not limited to the two regions shown in FIGS. 8A and 8B, and may also be three or more regions. For example, the valve stator 12 and the valve rotor 13 may be axially divided into three regions from the inside to the outside, or be sectorially divided into three regions. In coordination with the operation of the rotary valve, these regions can work individually with predefined protocols. In some embodiments, when the valve rotor 13 is rotated to one or more designed positions, one or more grooves 124, 127 and 135 and through holes 125 and 126 can connect one or more of these regions.

Figure 9:
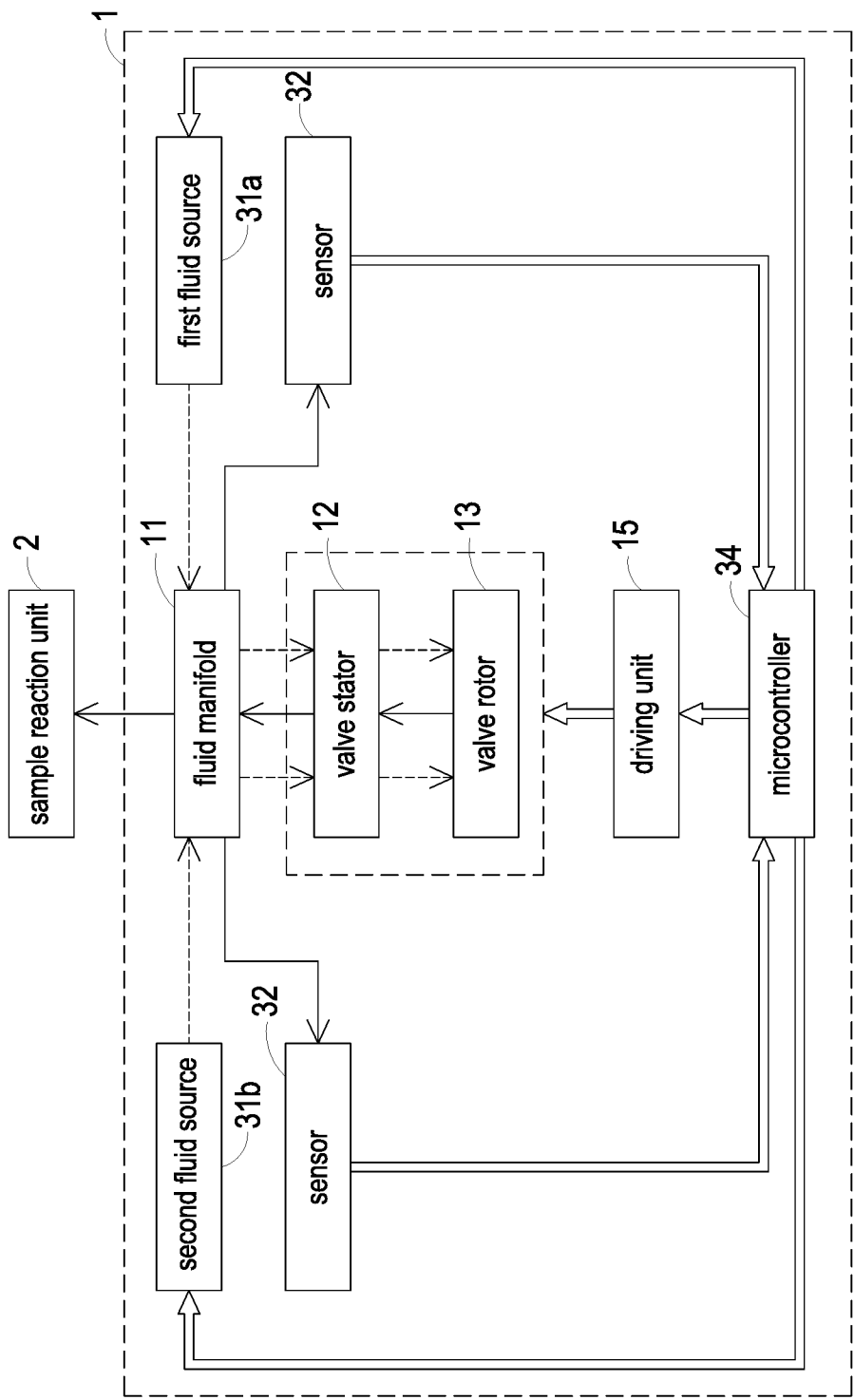
FIG. 9 shows the operation of the integrated fluidic module.

FIG. 9 shows the operation of the integrated fluidic module of the present invention, wherein hollow arrows indicate signal loops for control, programming and feedback, dashed arrows denote fluid input from the external fluid sources and solid arrows suggest fluid output after switching the fluid path by the rotary valve. As shown in FIG. 9, fluids are delivered into the fluid manifold 11 from the first fluid source 31a and the second fluid source 31b, and they are sent to the build-in rotary valve composed of the valve stator 12 and the valve rotor 13 for fluid path distribution. The rotation of the valve rotor 13 is driven by the driving unit 15, which is controlled by the microcontroller 34 according to the predefined protocols. When the valve rotor 13 is rotated by a certain angle to a predetermined position, the input fluids are distributed to one or more paths and they are further transported to the predefined chambers 21 in the sample reaction unit 2 through the microchannels 116 of the fluid manifold 11. In addition, the sensors 32 detect the internal signals, such as pressure, flow rate, temperature or pH, of the fluid manifold 11 and feedback the signals to the microcontroller 34, and the microcontroller 34 controls the fluid sources 31a and 31b and the driving unit 15 to be programmed with predefined schemes.

Please refer to FIG. 7 again. The fluids provided by the first fluid source 31a and the second fluid source 31b are inputted to the fluid manifold 11 through the fluid input channels 117. Since the third groove 135 on the top surface 131 of the valve rotor 13 is aligned with at least one of the first through holes 125, the second through holes 126 and the second groove 127 on the bottom surface 121 of the valve stator 12, and the first groove 124, the first through holes 125 and the second through holes 126 on the top surface 121 of the valve stator 12 are aligned with the second openings 1162 of the microchannels 116 and the fourth openings 1172 of the fluid input channels 117 of the fluid manifold 11, when the valve rotor 13 is rotated by a certain angle to a predetermined position, the fluid input channels 117 are communicated with the predefined microchannels 116 through the valve stator 12 and the valve rotor 13 and thus the fluids provided by the first fluid source 31a and the second fluid source 31b are directed to the chambers 21 of the sample reaction unit 2 which are connected with the predefined microchannels 116 so as to regulate the fluid operations in the multiple chambers 21 of the sample reaction unit 2. Particularly, the first groove 124 on the top surface 121 of the valve stator 12 are directly connected with the plural first through holes 125 to realize the multi-way fluid path switching.

FIG. 10A shows the fluid manifold according to another embodiment of the present invention. As shown in FIG. 10A, the fluid manifold 11 includes a rubber seal 35 and a dismountable embossing part 36. The rubber seal 35 is used to enhance the sealing between the fluid manifold 11 and the sample reaction unit 2. The embossing part 36 fixes the rubber seal 35 on the top surface 113 of the fluid manifold 11, and the assembling of the fluid manifold 11 and the embossing part 36 is simply achieved by press fit or other similar designs. In addition, since the embossing part 36 is a dismountable structure, it is easy for the replacement of the rubber seal 35 after a period of usage. Certainly, the rubber seal 35 includes holes 351 corresponding to the first openings 1161 on the top surface 113 of the fluid manifold 11.

FIG. 10B shows the fluid manifold according to an additional embodiment of the present invention. As shown in FIG. 10B, the fluid manifold 11 includes two slots 37 disposed at two opposite sides of the installation chamber 111 of the fluid manifold 11. The corresponding protrusions (not shown) of the sample reaction unit 2 can be inserted into the slots 37 for easily assembling the sample reaction unit 2 on the fluid manifold 11. Such design facilitates the positioning and the fixing of the sample reaction unit 2 and enables the sample reaction unit 2 to be tightly connected with the fluid manifold 11 without leak.

Figure 11:
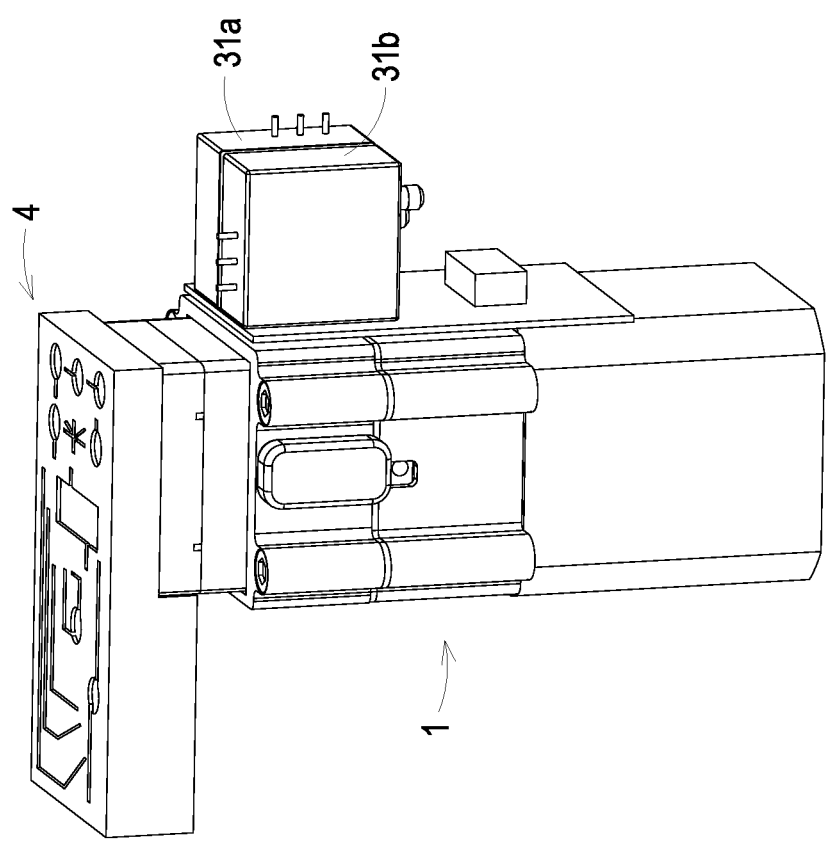
FIG. 11 shows the assembled structure of the integrated fluidic module and the sample cartridge.
Figure 12B:
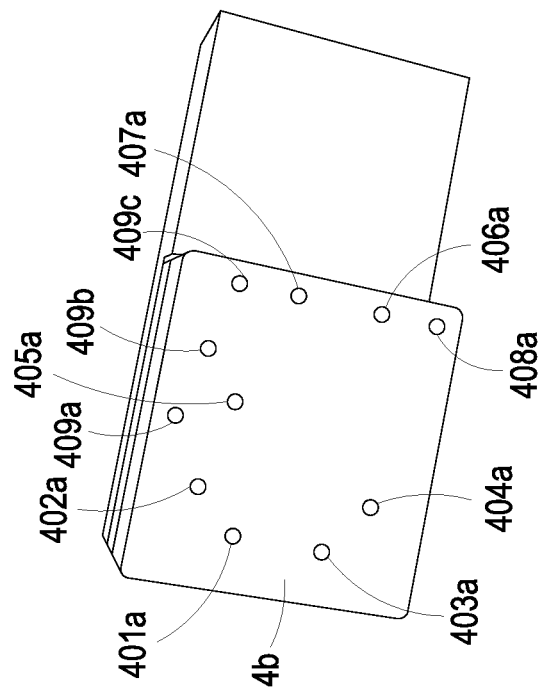
FIGS. 12A and 12B show different views of the sample cartridge in FIG. 11.
Figure 12A:
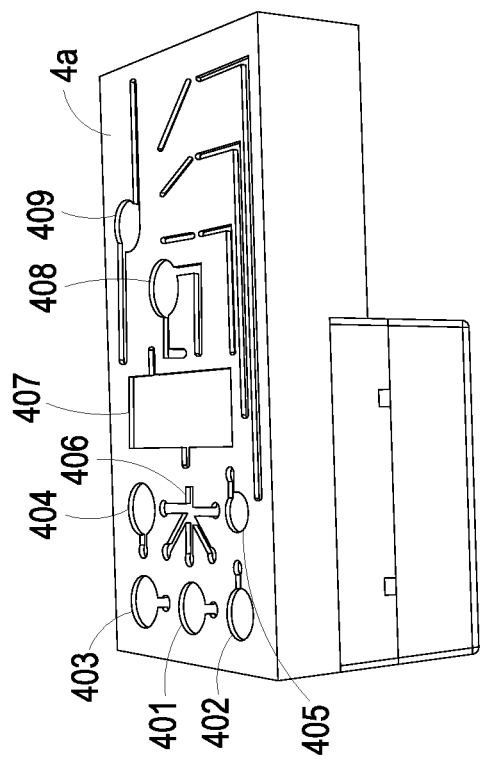

The following uses examples to illustrate the operations of the integrated fluidic module of the present invention. Please refer to FIGS. 11, 12A and 12B, wherein FIG. 11 shows the assembled structure of the integrated fluidic module and the sample cartridge, and FIGS. 12A and 12B show different views of the sample cartridge in FIG. 11. As shown in the figures, the sample cartridge 4 is mounted on the integrated fluidic module 1. The top surface 4a of the sample cartridge 4 includes plural chambers 401 to 409 which are connected by microchannels. The bottom surface 4b of sample cartridge 4 includes plural openings 401a to 409c which are accesses to the plural chambers 401 to 409 through microchannels. In this embodiment, the first fluid source 31a and the second fluid source 31b are pumps providing negative pressure and positive pressure, respectively, and the provided external fluids will be directed to the corresponding chambers 401 to 409 through the openings 401a to 409c after switching the fluid path by the build-in rotary valve.

Please refer to FIGS. 13A to 20C which show transparent views of the assembly of the valve rotor and the valve stator when the valve rotor is rotated to different positions, wherein these figures are viewed from the bottom of the valve rotor toward the valve stator. Please also refer to FIGS. 5A to 8B, and FIGS. 11 to 12B. In these embodiments, the first fluid source 31a is a pump providing negative pressure, and the provided fluid is directed to the second through hole 126 (denoted by V) at the center position in the inner region 121a of the valve stator 12 through the fluid input channel 117, and the second fluid source 31b is a pump providing positive pressure, and the provided fluid is directed to the outer region 121b which is corresponding to the position of the first groove 124b (denoted by P) of the valve stator 12 through the fluid input channel 117.

When the sample cartridge 4 is mounted on the integrated fluidic module 1, the plural openings 401a to 409c on the bottom surface 4b of the sample cartridge 4 are aligned and connected with the plural first openings 1161 on the top surface 113 of the fluid manifold 11, and further connected with the through holes or grooves 421 to 429 of the valve stator 12 through the microchannels 116 of the fluid manifold 11.

In an embodiment, the positions of the valve rotor 13 are defined by the rotation angles and include 20 positions (#1 to #20), and each position is uniformly arranged so that the neighboring positions are separated by 18 degrees. For example, the valve rotor 12 is rotated to position #2 from position #1 by 18 degrees. In another embodiment, the positions of the valve rotor 13 may not be uniformly arranged, and thus the neighboring positions are separated by an angle larger or smaller than 18 degrees.

The sample cartridge 4 shown in FIGS. 12A and 12B is used to illustrate how the integrated fluidic module 1 involves the fluid operations in the plural chambers 401 to 409 of the sample cartridge 4 but not used to limit the present invention. In an embodiment, the experiments or detections performed in the sample cartridge 4 includes eight steps, and FIG. 13A to 20C show the multi-way fluid path switching by the build-in rotary valve in this eight steps. For more clearly illustrating the rotation positions of the valve rotor 13, the third grooves 135 on the top surface 131 of the valve rotor 13 are further labeled with dots.

Figure 13B:
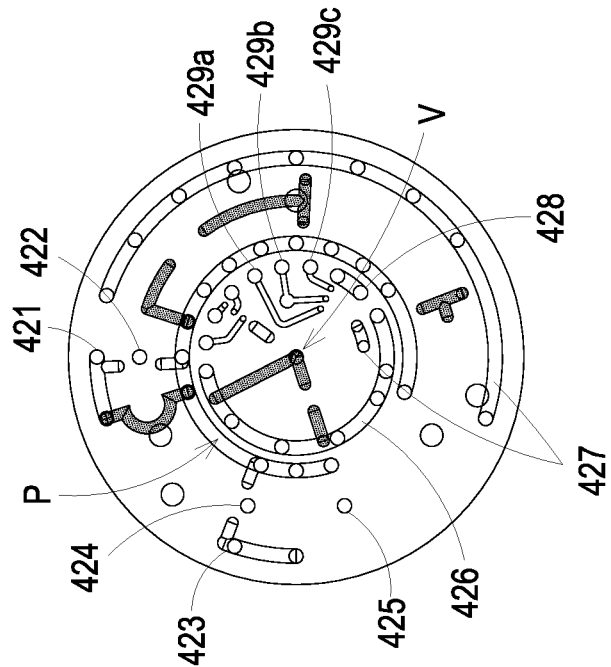
Figure 13A:
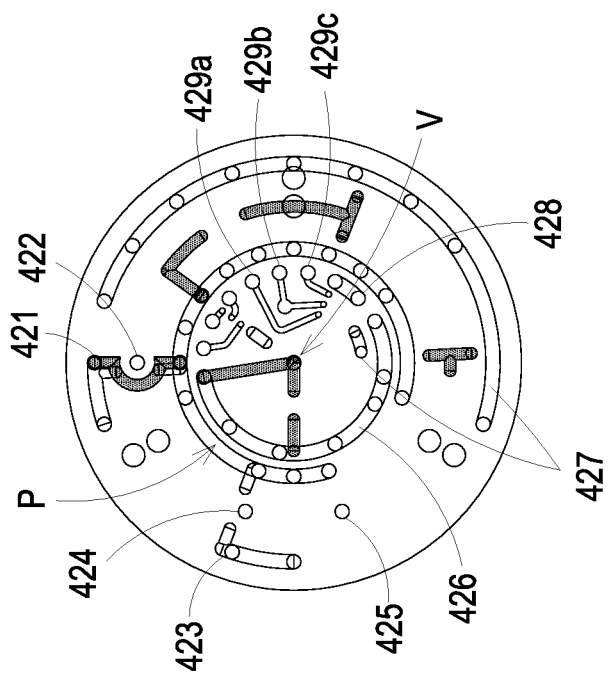

FIGS. 13A and 13B show the fluid path switching manner of the build-in rotary valve for step 1, which is to transport fluid from the chamber 401 to the chamber 406 and then from the chamber 406 to the chamber 407. First, the valve rotor 13 is located at the original position, i.e. position #1 (as shown in FIG. 13A), and the positive pressure (P) provided by the second fluid source 31b is introduced to the first groove 124b on the top surface 121 of the valve stator 12, and accordingly, the fluid with positive pressure is transported via the first groove 124b of the valve stator 12, the first through hole 125 of the valve stator 12 connected with the first groove 124b, and the third groove 135 of the valve rotor 13 connected with the first through hole 125, and then to the through hole 421 of the valve stator 12 connected with the third groove 135, and thus, the positive pressure is applied to the through hole 421. Since the through hole 421 is the access to the chamber 401 via the opening 401a, the chamber 401 is applied with the positive pressure as well. Meanwhile, the negative pressure (V) provided by the first fluid source 31a is introduced to the central second through hole 126 of the valve stator 12, and accordingly, the fluid with negative pressure is transported via the second through hole 126 of the valve stator 12, the third groove 135 of the valve rotor 13 connected with the second through hole 126, the first through hole 125 of the valve stator 12 connected with the third groove 135, and the first groove 124a of the valve stator 12 connected with the first through hole 125, and then to the groove 426 of the valve stator 12, and thus, the negative pressure is applied to the groove 426. Since the groove 426 is the access to the chamber 406 via the opening 406a, the chamber 406 is applied with the negative pressure as well. Therefore, by applying positive pressure to the chamber 401 and applying negative pressure to the chamber 426, the fluid (such as sample or reagent) in the chamber 401 is pushed to the chamber 406.

Subsequently, the valve rotor 13 is rotated by 18 degrees in a counterclockwise direction to the position #2 (as shown in FIG. 13B), and the positive pressure (P) provided by the second fluid source 31b is introduced to the first groove 124b on the top surface 121 of the valve stator 12, and accordingly, the fluid with positive pressure is transported via the first groove 124b of the valve stator 12, the first through hole 125 of the valve stator 12 connected with the first groove 124b, the third groove 135 of the valve rotor 13 connected with the first through hole 125, and the second groove 127 on the bottom surface 122 of the valve stator 12 connected with the third groove 135, and then to the through hole 421 of the valve stator 12 connected with the second groove 127, and thus, the positive pressure is applied to the through hole 421. Since the through hole 421 is the access to the chamber 401 via the opening 401a, the chamber 401 is applied with the positive pressure as well. Meanwhile, the negative pressure (V) provided by the first fluid source 31a is introduced to the central second through hole 126 of the valve stator 12, however, since the third groove 135 of the valve rotor 13 connected with the central second through hole 126 is not connected with any through hole or groove of the valve stator 12, the fluid path is blocked and thus no chamber of the sample cartridge 4 will be applied with negative pressure. Since the chamber 401 is continuously applied with positive pressure, the fluid in the chamber 406 can be further pushed to the chamber 407.

According to the above descriptions, the fluid operations in the plural chambers 401 to 409 of the sample cartridge 4 depend on the layout designs of the through holes and grooves on the valve stator 12 and the valve rotor 13. When the valve rotor 13 is rotated by a certain angle to a predetermined position, the predefined fluid paths are connected so that the fluid with negative pressure provided by the first fluid source 31a and the fluid with positive pressure provided by the second fluid source 31b can be transported to the corresponding microchannels of the fluid manifold 11 via the fluid paths and then further transported to the corresponding chambers 401 to 409 of the sample cartridge 4, and thereby applying positive or negative pressure to the corresponding chambers 401 to 409. Therefore, the fluids, such as the sample or reagents, in the chambers 401 to 409 can be pushed to flow toward desired directions, so as to regulate the fluid operations in the chambers 401 to 409.

Since the sample cartridge 4 shown in FIGS. 12A and 12B is only used to illustrate how the integrated fluidic module 1 involves the fluid operations in the plural chambers 401 to 409 of the sample cartridge 4 but not used to limit the present invention, and the operation principles of FIGS. 14A to 20C are similar to those in FIGS. 13A and 13B, the corresponding steps for the experiments or detections shown in FIGS. 14A to 20C are not redundantly described here, and only the fluid path switching based on the rotations of the valve rotor 13 shown in FIGS. 14A to 20C are interpreted.

Figure 14A:
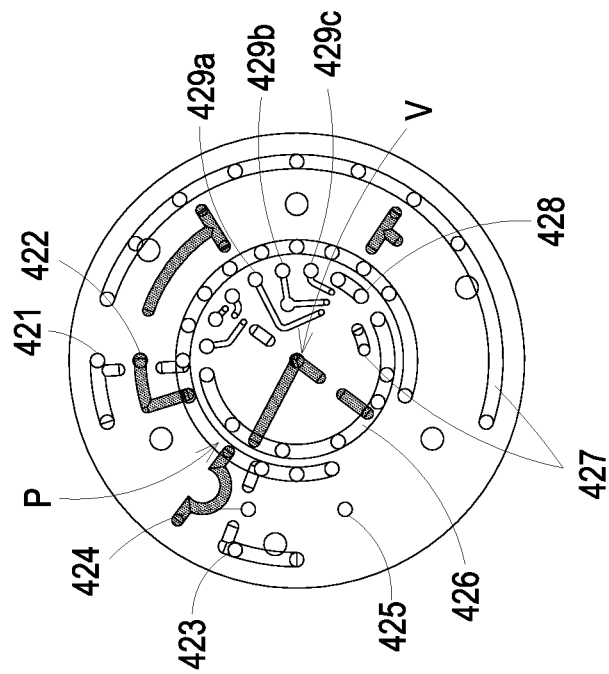
Figure 14B:
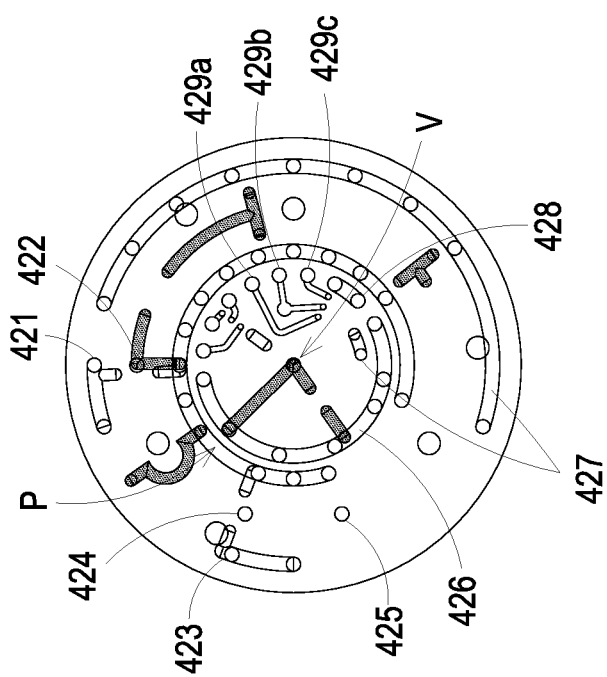

As shown in FIG. 14A, the valve rotor 13 is rotated by 18 degrees in a counterclockwise direction from the position #2 to the position #3, and the fluid with positive pressure is transported to the through hole 422 of the valve stator 12 via the fluid path provided by the alignments of the through holes and/or grooves of the valve stator 12 and the valve rotor 13, so that the through hole 422 and the corresponding chamber are applied with positive pressure. Meanwhile, the fluid with negative pressure is transported to the groove 426 of the valve stator 12 via the fluid path provided by the alignments of the through holes and/or grooves of the valve stator 12 and the valve rotor 13, so that the groove 426 and the corresponding chamber are applied with negative pressure. Later, as shown in FIG. 14B, the valve rotor 13 is rotated by 18 degrees in a counterclockwise direction from the position #3 to the position #4, and the fluid with positive pressure is also transported to the through hole 422 of the valve stator 12 via the fluid path provided by the alignments of the through holes and/or grooves of the valve stator 12 and the valve rotor 13, so that the through hole 422 and the corresponding chamber are applied with positive pressure. Meanwhile, the fluid path for the fluid with negative pressure is blocked.

Figure 15B:
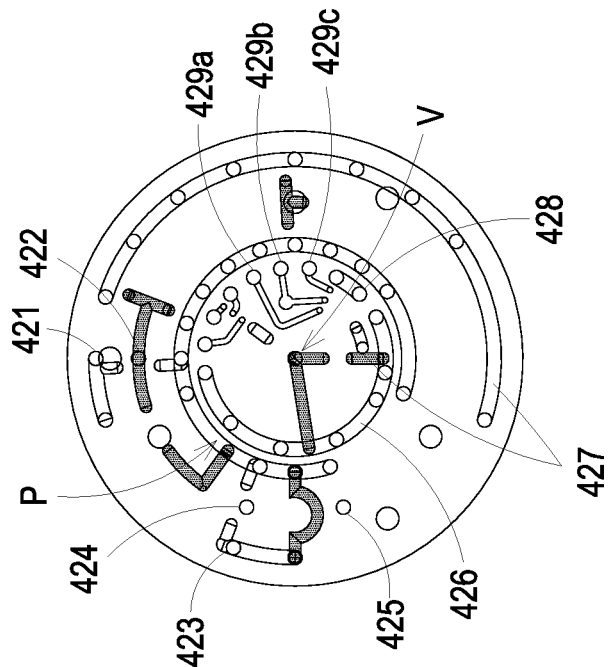
Figure 15A:
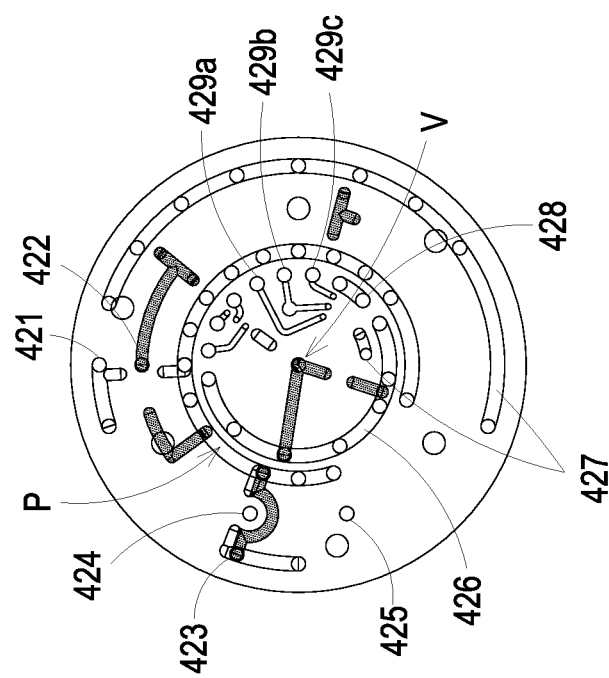

As shown in FIG. 15A, the valve rotor 13 is rotated by 18 degrees in a counterclockwise direction from the position #4 to the position #5, and the fluid with positive pressure is transported to the through hole 423 of the valve stator 12 via the fluid path provided by the alignments of the through holes and/or grooves of the valve stator 12 and the valve rotor 13, so that the through hole 423 and the corresponding chamber are applied with positive pressure. Meanwhile, the fluid with negative pressure is transported to the groove 426 of the valve stator 12 via the fluid path provided by the alignments of the through holes and/or grooves of the valve stator 12 and the valve rotor 13, so that the groove 426 and the corresponding chamber are applied with negative pressure. Later, as shown in FIG. 15B, the valve rotor 13 is rotated by 18 degrees in a counterclockwise direction from the position #5 to the position #6, and the fluid with positive pressure is also transported to the through hole 423 of the valve stator 12 via the fluid path provided by the alignments of the through holes and/or grooves of the valve stator 12 and the valve rotor 13, so that the through hole 423 and the corresponding chamber are applied with positive pressure. Meanwhile, the fluid path for the fluid with negative pressure is blocked.

Figure 16B:
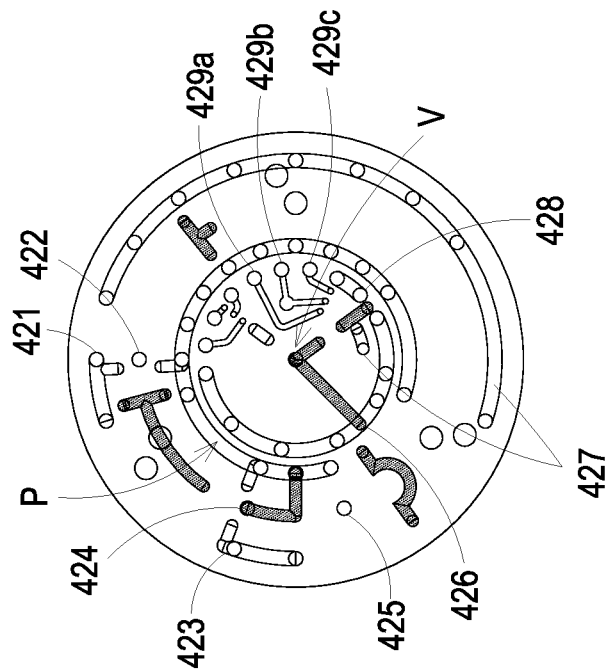
Figure 16A:
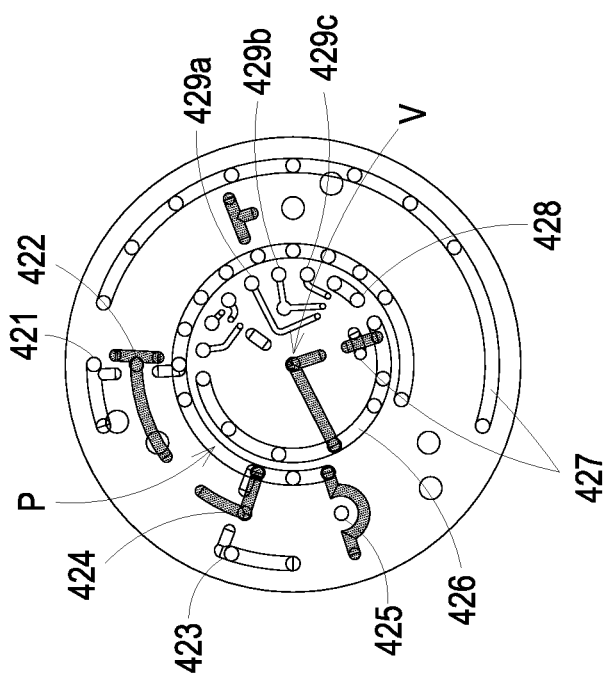

As shown in FIG. 16A, the valve rotor 13 is rotated by 18 degrees in a counterclockwise direction from the position #6 to the position #7, and the fluid with positive pressure is transported to the through hole 424 of the valve stator 12 via the fluid path provided by the alignments of the through holes and/or grooves of the valve stator 12 and the valve rotor 13, so that the through hole 424 and the corresponding chamber are applied with positive pressure. Meanwhile, the fluid with negative pressure is transported to the groove 426 of the valve stator 12 via the fluid path provided by the alignments of the through holes and/or grooves of the valve stator 12 and the valve rotor 13, so that the groove 426 and the corresponding chamber are applied with negative pressure. Later, as shown in FIG. 16B, the valve rotor 13 is rotated by 18 degrees in a counterclockwise direction from the position #7 to the position #8, and the fluid with positive pressure is also transported to the through hole 424 of the valve stator 12 via the fluid path provided by the alignments of the through holes and/or grooves of the valve stator 12 and the valve rotor 13, so that the through hole 424 and the corresponding chamber are applied with positive pressure. Meanwhile, the fluid path for the fluid with negative pressure is blocked.

Figure 17B:
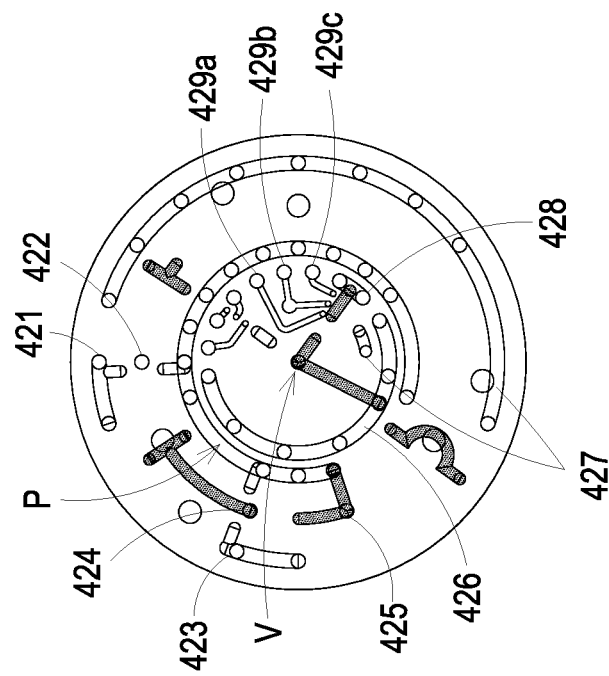
Figure 17A:
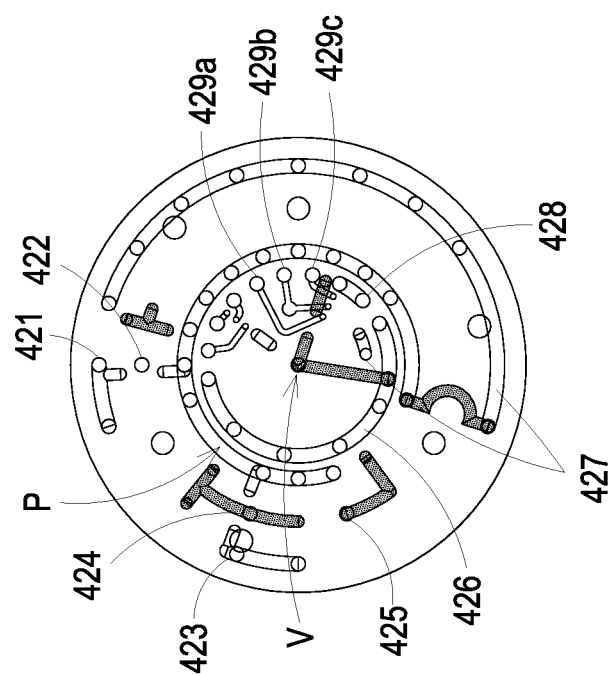

As shown in FIG. 17A, the valve rotor 13 is rotated by 36 degrees in a counterclockwise direction from the position #8 to the position #10, and the fluid with positive pressure is transported to the groove 427 of the valve stator 12 via the fluid path provided by the alignments of the through holes and/or grooves of the valve stator 12 and the valve rotor 13, so that the groove 427 and the corresponding chamber are applied with positive pressure. Meanwhile, the fluid with negative pressure is transported to the groove 426 of the valve stator 12 via the fluid path provided by the alignments of the through holes and/or grooves of the valve stator 12 and the valve rotor 13, so that the groove 426 and the corresponding chamber are applied with negative pressure. Later, as shown in FIG. 17B, the valve rotor 13 is rotated by 18 degrees in a clockwise direction from the position #10 to the position #9, and the fluid with positive pressure is transported to the through hole 425 of the valve stator 12 via the fluid path provided by the alignments of the through holes and/or grooves of the valve stator 12 and the valve rotor 13, so that the through hole 425 and the corresponding chamber are applied with positive pressure. Meanwhile, the fluid with negative pressure is transported to the groove 426 of the valve stator 12 via the fluid path provided by the alignments of the through holes and/or grooves of the valve stator 12 and the valve rotor 13, so that the groove 426 and the corresponding chamber are applied with negative pressure.

Figure 18B:
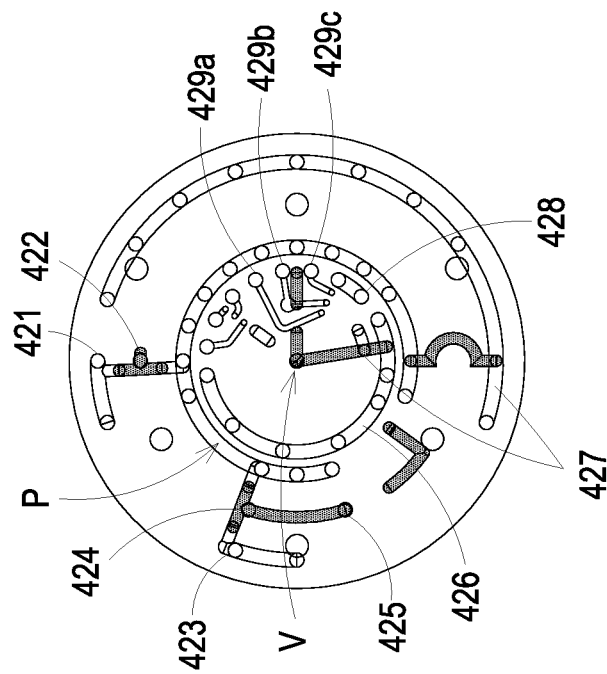
Figure 18A:
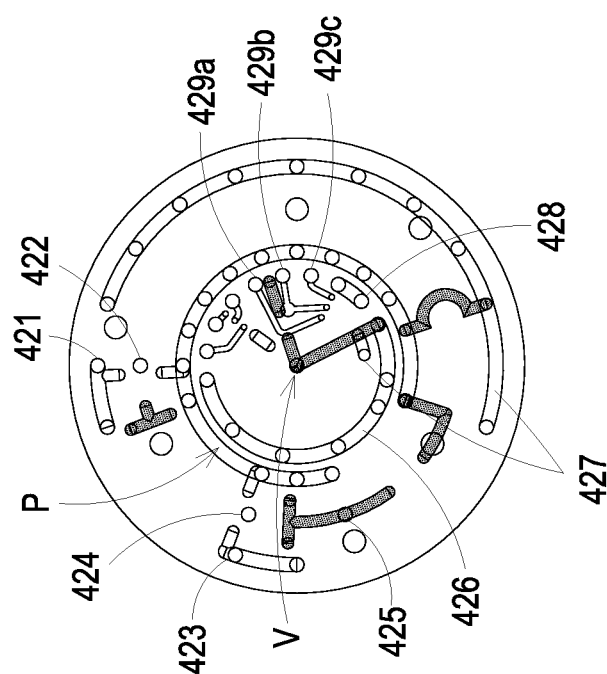

As shown in FIG. 18A, the valve rotor 13 is rotated by 54 degrees in a counterclockwise direction from the position #9 to the position #12, and the fluid path for the fluid with positive pressure is blocked. Meanwhile, the fluid with negative pressure is transported to the groove 426 and the through hole 427 of the valve stator 12 via the fluid paths provided by the alignments of the through holes and/or grooves of the valve stator 12 and the valve rotor 13, so that the groove 426 and the through hole 427 and the corresponding chambers are applied with negative pressure. Later, as shown in FIG. 18B, the valve rotor 13 is rotated by 18 degrees in a clockwise direction from the position #12 to the position #11, and the fluid with positive pressure is transported to the through holes 421, 422, 423, 424 and 425 of the valve stator 12 via the fluid paths provided by the alignments of the through holes and/or grooves of the valve stator 12 and the valve rotor 13, so that the through holes 421, 422, 423, 424 and 425 and the corresponding chambers are applied with positive pressure. Meanwhile, the fluid with negative pressure is transported to the through hole 427 of the valve stator 12 via the fluid path provided by the alignments of the through holes and/or grooves of the valve stator 12 and the valve rotor 13, so that the through hole 427 and the corresponding chamber are applied with negative pressure.

In this example, as shown in FIG. 18A, two fluid paths are provided for the fluid with negative pressure, which means two chambers of the sample cartridge 4 are applied with negative pressure simultaneously. Further, as shown in FIG. 18B, five fluid paths are provided for the fluid with positive pressure, which means five chambers of the sample cartridge 4 are applied with positive pressure simultaneously. In other words, according to the layout designs of the through holes and grooves on the valve stator 12 and the valve rotor 13, more than one fluid path for one type of fluid can be provided simultaneously, and thus, more variety of fluid operation steps can be realized. For example, the through holes 421 to 425 are applied with positive pressure simultaneously, so the corresponding chambers 401 to 405 are also applied with positive pressure simultaneously, which can perform the step of evacuating reagents in the chambers 401 to 405 to the waste chamber.

Figure 19B:
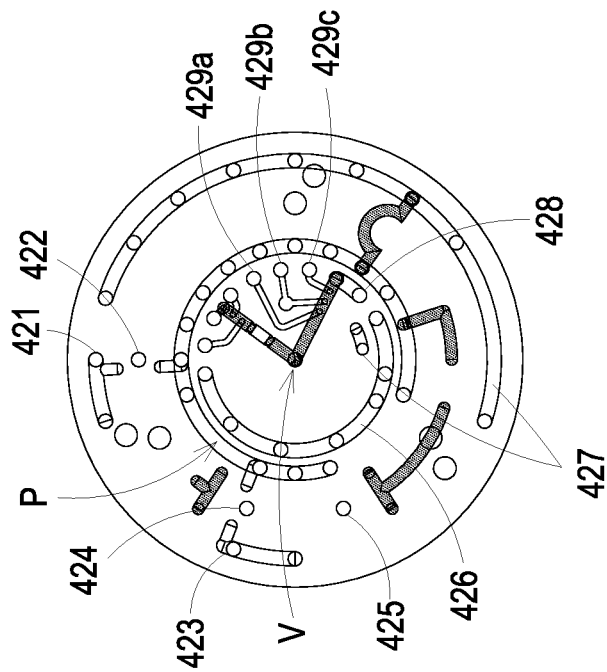
Figure 19A:
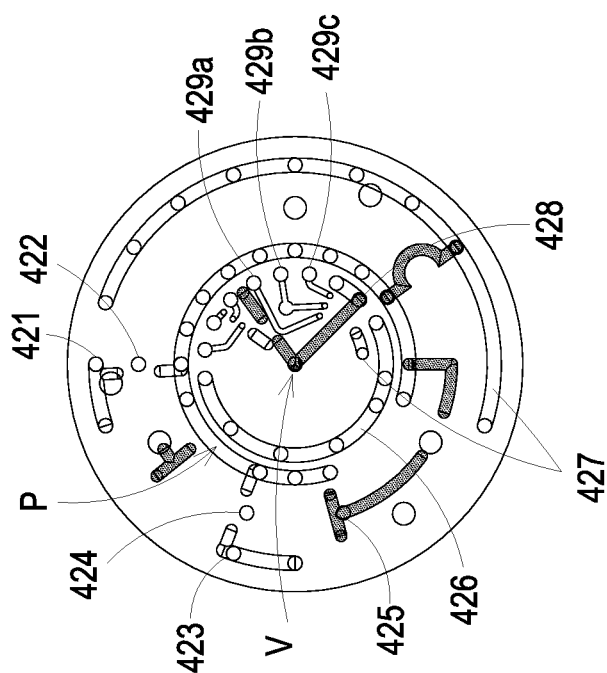

As shown in FIG. 19A, the valve rotor 13 is rotated by 36 degrees in a counterclockwise direction from the position #11 to the position #13, and the fluid path for the fluid with positive pressure is transported to the groove 427 of the valve stator 12 via the fluid path provided by the alignments of the through holes and/or grooves of the valve stator 12 and the valve rotor 13, so that the groove 427 and the corresponding chamber are applied with positive pressure. Meanwhile, the fluid with negative pressure is transported to the through hole 428 of the valve stator 12 via the fluid path provided by the alignments of the through holes and/or grooves of the valve stator 12 and the valve rotor 13, so that the through hole 428 and the corresponding chambers are applied with negative pressure. Later, as shown in FIG. 19B, the valve rotor 13 is rotated by 18 degrees in a counterclockwise direction from the position #13 to the position #14, and the fluid with positive pressure is transported to the groove 427 of the valve stator 12 via the fluid path provided by the alignments of the through holes and/or grooves of the valve stator 12 and the valve rotor 13, so that the groove 427 and the corresponding chamber are applied with positive pressure. Meanwhile, the fluid with negative pressure is transported to the through holes 428, 429a, 429b and 429c of the valve stator 12 via the fluid paths provided by the alignments of the through holes and/or grooves of the valve stator 12 and the valve rotor 13, so that the through holes 428, 429a, 429b and 429c and the corresponding chamber are applied with negative pressure.

As shown in FIG. 20A, the valve rotor 13 is rotated by 18 degrees in a counterclockwise direction from the position #14 to the position #15, and the fluid path for the fluid with positive pressure is transported to the groove 427 of the valve stator 12 via the fluid path provided by the alignments of the through holes and/or grooves of the valve stator 12 and the valve rotor 13, so that the groove 427 and the corresponding chamber are applied with positive pressure. Meanwhile, the fluid with negative pressure is transported to the through hole 429c of the valve stator 12 via the fluid path provided by the alignments of the through holes and/or grooves of the valve stator 12 and the valve rotor 13, so that the through hole 429c and the corresponding chambers are applied with negative pressure. Later, as shown in FIG. 20B, the valve rotor 13 is rotated by 18 degrees in a counterclockwise direction from the position #15 to the position #16, and the fluid with positive pressure is transported to the groove 427 of the valve stator 12 via the fluid path provided by the alignments of the through holes and/or grooves of the valve stator 12 and the valve rotor 13, so that the groove 427 and the corresponding chamber are applied with positive pressure. Meanwhile, the fluid with negative pressure is transported to the through hole 429b of the valve stator 12 via the fluid path provided by the alignments of the through holes and/or grooves of the valve stator 12 and the valve rotor 13, so that the through hole 429b and the corresponding chamber are applied with negative pressure. Then, as shown in FIG. 20C, the valve rotor 13 is rotated by 18 degrees in a counterclockwise direction from the position #16 to the position #17, and the fluid with positive pressure is transported to the groove 427 of the valve stator 12 via the fluid path provided by the alignments of the through holes and/or grooves of the valve stator 12 and the valve rotor 13, so that the groove 427 and the corresponding chamber are applied with positive pressure. Meanwhile, the fluid with negative pressure is transported to the through hole 429a of the valve stator 12 via the fluid path provided by the alignments of the through holes and/or grooves of the valve stator 12 and the valve rotor 13, so that the through hole 429a and the corresponding chamber are applied with negative pressure.

In the examples shown in FIGS. 13A to 20C, as many as twenty fluid paths can be switched, wherein the sample processing is accomplished by rotating the valve rotor 13 from position #1 to position #17, and the position switching is operated according to the requirement of fluid path switching and is not necessary to be operated in sequence. In these examples, three positions are not used and can be reserved for extending functions. Certainly, the positions of the valve rotor 13 are not limited to the twenty positions separated by 18 degrees, and they can be designed in different manners based on the layouts of the through holes and grooves on the valve stator 12 and the valve rotor 13.

In some embodiments, when the quantity of the openings at the bottom of the sample reaction unit 2 is different or less than the quantity of the first openings 1161 of the fluid manifold 11, only some of the first openings 1161 and the corresponding microchannels 116 of the fluid manifold 11 can be connected with the sample reaction unit 2, and the rest of them are naturally blocked by the body of the sample reaction unit 2. Accordingly, once the build-in rotary valve is in operation, the valve positions connected to these blocked first openings 1161 are skipped. Therefore, by means of the modular design, the integrated fluidic module 1 of the present invention is able to be applied to different sample reaction units 2, which increases the applicability of the integrated fluidic module 1 of the present invention.

In addition, the integrated fluidic module 1 of the present invention is capable of catering flexible sample processing protocols by selectively defining certain valve operation procedures. In some embodiments, each valve position and their operation orders could be freely combined and thus versatile sample processing protocols can be achieved. In many biological, chemical and life science processes, the primary working principle is maintained while for specific samples or species, their respective processes are slightly different. For example, the infectious disease diagnostic devices are capable of covering a wide range of samples. However, for each sample to be detected, the type, volume and quantity of chemical buffers, bio assay and the methods of capturing, lysis and purification are not always same. The integrated fluidic module 1 of the present invention has the ability of dealing with these flexible sample processing protocols by the operations of the rotary valve.

Moreover, compared to the conventional techniques using the electromagnetic valves for fluid path switching, the integrated fluidic module 1 of the present invention using single build-in rotary valve for fluid path switching greatly reduces the cost and equipment space. Further, the integrated fluidic module 1 of the present invention uses the microchannels 116 of the fluid manifold 11 to connect the sample reaction unit 2 and the valve stator 12, so the drawbacks of short lifespan, space consuming, poor manufacturability and low reliability of the tubing used in the conventional techniques can be avoided. Besides, the integrated fluidic module 1 of the present invention is a modular design which is able to be applied to different sample reaction unit 2, and thus possesses high industrial value.

In conclusion, the present invention provides an integrated fluidic module including the fluid manifold, the valve stator, the valve rotor and the valve housing. The fluid manifold includes plural microchannels for connecting with the sample reaction unit. By the alignments of the through holes and/or grooves of the valve stator and the valve rotor, multi-way fluid path switching is realized when the valve rotor is rotated to different positions, so as to regulate the fluid operations in the multiple chambers of the sample reaction unit. On the other hand, compared to the conventional techniques, the integrated fluidic module 1 of the present invention has advantages of low cost, space saving, long lifespan, good manufacturability, high reliability, and compact modular design, and thus possesses high industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An integrated fluidic module connected with a sample reaction unit having multiple chambers to regulate fluid operations in a multi-fluid-system, the integrated fluidic module comprising:
   a fluid manifold comprising a main body, plural microchannels and plural fluid input channels, wherein each of the plural microchannels penetrates through the main body and is connected with a corresponding chamber of the sample reaction unit, and the plural fluid input channels are connected with plural fluid sources;
   a valve stator attached to the fluid manifold and comprising at least one first groove, at least one second groove and plural through holes, wherein the at least one first groove is disposed on a top surface of the valve stator, the at least one second groove is disposed on a bottom surface of the valve stator, each of the first and second grooves is directly connected with at least one of the plural through holes, and at least parts of the first groove and the through holes are communicated with the plural microchannels and plural fluid input channels of the fluid manifold;
   a valve rotor attached to the valve stator and comprising at least one groove disposed on a top surface of the valve rotor; and
   a valve housing comprising a receiving chamber for accommodating the valve rotor and the valve stator and fixed and assembled with the fluid manifold to form a modular structure,
   wherein when the valve rotor is rotated to different positions, the at least one groove of the valve rotor is connected with at least one of the plural through holes or the at least one second groove of the valve stator to provide at least one fluid path and enable fluids provided by the fluid sources to be directed to the corresponding chambers of the sample reaction unit through the fluid path and thus regulate the fluid operations of the corresponding chambers.

2. The integrated fluidic module according to claim 1 wherein the valve stator and the valve rotor respectively includes plural regions corresponding to the plural fluid sources for regulating fluid path switching of the corresponding fluid sources.

3. The integrated fluidic module according to claim 1 wherein the plural fluid sources includes a fluid source with positive pressure and a fluid source with negative pressure.

4. The integrated fluidic module according to claim 1 wherein the at least one first groove of the valve stator includes plural first grooves, and the plural first grooves are extended along concentric circles with different radiuses.

5. The integrated fluidic module according to claim 1 wherein the plural through holes of the valve stator includes plural first through holes and plural second through holes, the plural first through holes are directly connected with the at least one first groove, the plural second through holes are not directly connected with the at least one first groove, and each of the at least one first groove is directly connected with at least two of the plural first through holes.

6. The integrated fluidic module according to claim 5 wherein each of the at least one second groove of the valve stator is directly connected with at least one of the plural second through holes.

7. The integrated fluidic module according to claim 1 further comprising a driving unit, wherein the driving unit includes a shaft and a motor, and the shaft is connected with the valve rotor.

8. The integrated fluidic module according to claim 7, wherein a blind hole is disposed at a bottom surface of the valve rotor, and the shaft is inserted into the blind hole.

9. The integrated fluidic module according to claim 1 wherein the valve rotor is manually operated.

10. The integrated fluidic module according to claim 1 further comprising at least one sensor connected to the fluid manifold for detecting internal signals of the fluid manifold.

11. The integrated fluidic module according to claim 1 further comprising a circuit board and a microcontroller for controlling the integrated fluidic module to be programmed with predefined schemes for fluid path switching.

12. The integrated fluidic module according to claim 1 wherein the fluid manifold includes an installation chamber and a receiving chamber, the installation chamber installs the sample reaction unit thereon, and the receiving chamber accommodates the valve stator therein.

13. The integrated fluidic module according to claim 1 wherein each of the plural microchannels of the fluid manifold has an opening, and two or more of the plural microchannels have the same opening.

14. The integrated fluidic module according to claim 1 further comprising a gasket sandwiched between the fluid manifold and the valve stator.

15. The integrated fluidic module according to claim 14 wherein the gasket includes plural through holes, which are connected with the plural microchannels and the plural fluid input channels of the fluid manifold.

16. The integrated fluidic module according to claim 14 further comprising plural first fixing elements for penetrating through corresponding holes of the fluid manifold, the gasket and the valve stator.

17. The integrated fluidic module according to claim 1 further comprising a spacer which is sandwiched between the fluid manifold and the valve housing and has a central through hole corresponding to the valve stator and the valve rotor.

18. The integrated fluidic module according to claim 17 further comprising plural second fixing elements for penetrating through corresponding holes of the fluid manifold, the spacer and the valve housing.

19. The integrated fluidic module according to claim 1 wherein the fluid manifold includes a rubber seal disposed on a top surface of the fluid manifold.

20. The integrated fluidic module according to claim 1 wherein the fluid manifold includes two slots so that the sample reaction unit is able to be inserted into the slots.

21. The integrated fluidic module according to claim 1 wherein the sample reaction unit is a sample cartridge or a microfluidic chip.

\* \* \* \* \*